United States Patent
Aitcin et al.

(10) Patent No.: US 11,421,771 B2
(45) Date of Patent: Aug. 23, 2022

(54) CONTINUOUSLY VARIABLE TRANSMISSION DRIVE PULLEY

(71) Applicant: BOMBARDIER RECREATIONAL PRODUCTS INC., Valcourt (CA)

(72) Inventors: Xavier-Pierre Aitcin, St-Hyacinthe (CA); Max Richer, Valcourt (CA); Mathieu Gauthier, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 1029 days.

(21) Appl. No.: 15/771,819

(22) PCT Filed: Oct. 31, 2016

(86) PCT No.: PCT/IB2016/056564
§ 371 (c)(1),
(2) Date: Apr. 27, 2018

(87) PCT Pub. No.: WO2017/072743
PCT Pub. Date: May 4, 2017

(65) Prior Publication Data
US 2019/0063582 A1   Feb. 28, 2019

Related U.S. Application Data

(60) Provisional application No. 62/248,662, filed on Oct. 30, 2015.

(51) Int. Cl.
*F16H 55/56* (2006.01)
*B62M 27/02* (2006.01)
(Continued)

(52) U.S. Cl.
CPC .............. *F16H 55/56* (2013.01); *B62M 27/02* (2013.01); *F16H 9/12* (2013.01); *F16H 9/16* (2013.01); *F16H 9/18* (2013.01); *F16H 55/563* (2013.01)

(58) Field of Classification Search
CPC .......... F16H 55/56; F16H 55/563; F16H 9/00; F16H 9/12; F16H 9/125; F16H 9/16;
(Continued)

(56) References Cited

U.S. PATENT DOCUMENTS 3,699,827 A * 10/1972 Vogel .................. F16H 61/6625
474/12
3,757,594 A    9/1973 Kumm
(Continued)

FOREIGN PATENT DOCUMENTS

JP    2009063048 A  *  3/2009 ............. F16G 5/166
SU        1052768 A1    11/1983
(Continued)

OTHER PUBLICATIONS

International Search Report of PCT/IB2016/056564; Shane Thomas; dated Mar. 3, 2017.
(Continued)

*Primary Examiner* — Michael R Mansen
*Assistant Examiner* — Raveen J Dias
(74) *Attorney, Agent, or Firm* — BCF LLP

(57) ABSTRACT

A drive pulley for a continuously variable transmission comprising a fixed sheave having a first sheave face, a movable sheave axially movable relative to the fixed sheave along an axis of rotation of the continuously variable transmission, the movable sheave having a second sheave face, the fixed sheave and the movable sheave rotating about the axis of rotation and a separation measured at a constant radial distance from the axis of rotation along an axial direction between the first sheave face and the second sheave face, the separation varying around the axis of rotation.

35 Claims, 15 Drawing Sheets

(51) Int. Cl.
*F16H 9/12* (2006.01)
*F16H 9/16* (2006.01)
*F16H 9/18* (2006.01)

(58) Field of Classification Search
CPC ........ F16H 2009/163; F16H 9/18; F16H 9/04; F16H 9/06; F16H 9/08; F16H 9/14; F16H 55/566
See application file for complete search history.

(56) References Cited

U.S. PATENT DOCUMENTS

| | | | | |
|---|---|---|---|---|
| 4,668,208 | A * | 5/1987 | Jaccod | F16H 55/563 474/43 |
| 6,902,023 | B2 | 6/2005 | Brendelson et al. | |
| 2002/0042313 | A1* | 4/2002 | Aitcin | F16H 55/56 474/8 |
| 2003/0144097 | A1* | 7/2003 | Brandsma | F16G 5/16 474/8 |
| 2004/0018903 | A1* | 1/2004 | Takagi | F16H 9/125 474/8 |
| 2004/0248683 | A1 | 12/2004 | Brandsma et al. | |
| 2006/0178239 | A1 | 8/2006 | Reisch et al. | |
| 2011/0263363 | A1* | 10/2011 | Schoenfelder | F16H 55/56 474/46 |
| 2012/0309569 | A1 | 12/2012 | Faes | |
| 2013/0146406 | A1 | 6/2013 | Nichols et al. | |
| 2014/0004984 | A1* | 1/2014 | Aitcin | F16H 63/067 474/14 |
| 2014/0287854 | A1* | 9/2014 | Yamane | F16H 9/18 474/8 |
| 2014/0349792 | A1* | 11/2014 | Aitcin | F16H 63/067 474/13 |
| 2015/0267792 | A1* | 9/2015 | Hochmayr | F16H 63/065 474/14 |
| 2016/0047457 | A1* | 2/2016 | Tabuchi | F16H 57/029 474/8 |
| 2016/0356379 | A1* | 12/2016 | Roland | B62M 9/08 |
| 2018/0195606 | A1* | 7/2018 | Roland | B60W 50/082 |

FOREIGN PATENT DOCUMENTS

| | | |
|---|---|---|
| WO | 9001129 A1 | 2/1990 |
| WO | 2013032463 A2 | 3/2013 |
| WO | 2015114603 A2 | 8/2015 |
| WO | 2015151032 A1 | 10/2015 |

OTHER PUBLICATIONS

English translation of SU1052768A1 retrieved from https://patents.google.com/ on Mar. 20, 2020.
Search Report issued from the ROSPATENT dated Mar. 13, 2020 in connection with the application No. 2018118845.

* cited by examiner

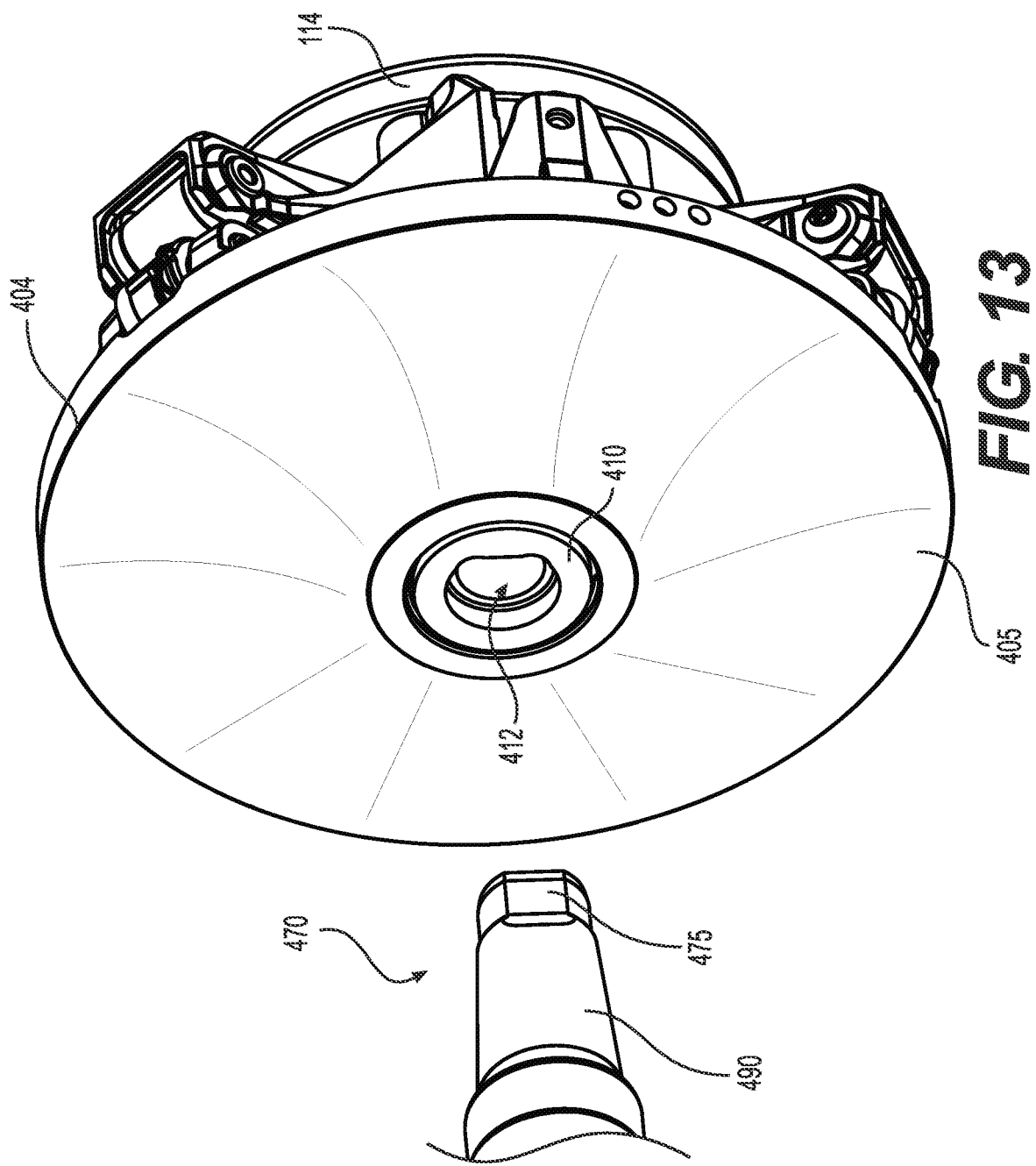

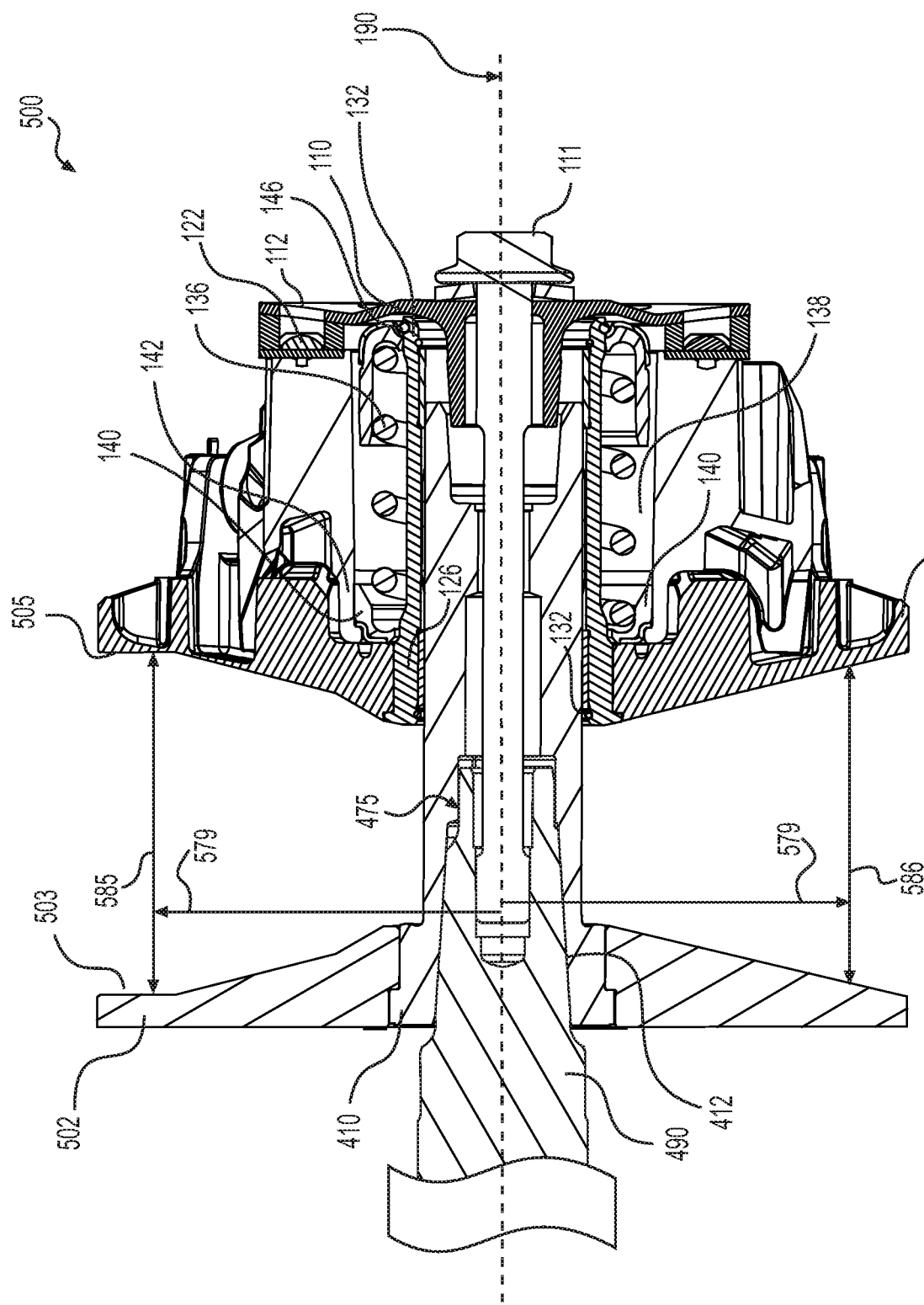

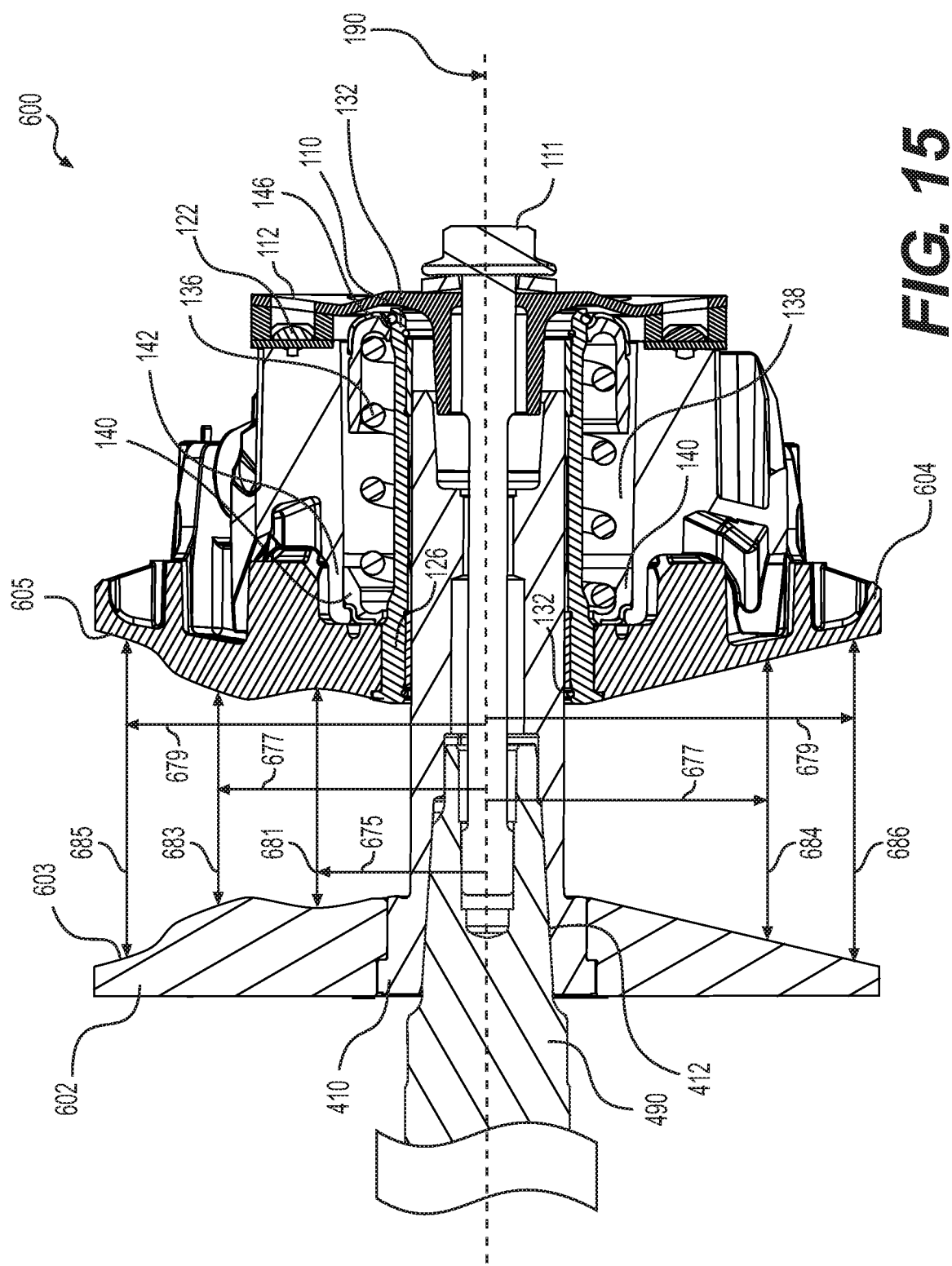

CONTINUOUSLY VARIABLE TRANSMISSION DRIVE PULLEY

CROSS-REFERENCE

The present application claims priority to U.S. Provisional Patent Application No. 62/248,662 filed on Oct. 30, 2015, the entirety of which is incorporated herein by reference.

TECHNICAL FIELD

The present technology relates to drive pulleys for continuously variable transmissions.

BACKGROUND

Many vehicle powertrains incorporate a continuously variable transmission (CVT) having a drive pulley that is operatively coupled to the engine crankshaft and a driven pulley coupled to a driven shaft. The drive pulley transfers torque to the driven pulley via a drive belt looped around both pulleys. Typically, the driven shaft is a transverse countershaft which drives the input member of a chain and sprocket reduction drive. The output of the reduction drive is coupled to one end of an axle on which are located the sprocket wheels that drive the snowmobile's drive track.

Engines are typically rubber-mounted to the frame, in part to reduce the engine vibrations transferred to the frame and thus to the riders. The driven shaft of the CVT is typically not vibrationally isolated from the frame, however, and some vibrations can be transferred from the engine to the frame via the drive belt looped around the drive pulley and the driven pulley. Additionally, unbalanced moments and forces of rotating components, for instance cyclical displacement of the engine, crankshaft and drive pulley with respect to the driven pulley, can cause an oscillating tension force in the drive belt, pulling on the driven pulley, and vibrations felt by the user of the vehicle.

SUMMARY

It is an object of the present to ameliorate at least some of the inconveniences present in the prior art.

According to an aspect of the present technology, there is provided a drive pulley for a continuously variable transmission comprising a fixed sheave having a first sheave face; a movable sheave axially movable relative to the fixed sheave along an axis of rotation of the continuously variable transmission, the movable sheave having a second sheave face, the fixed sheave and the movable sheave rotating about the axis of rotation and a separation measured at a constant radial distance from the axis of rotation along an axial direction between the first sheave face and the second sheave face, the separation varying around the axis of rotation.

In some implementations of the present technology, the first sheave face is symmetric about an axis of symmetry and the axis of symmetry is skewed relative to the axis of rotation.

In some implementations of the present technology, the first sheave face is asymmetric around the axis of rotation and the second sheave face is symmetric around the axis of rotation.

In some implementations of the present technology, the first sheave face is symmetric around the axis of rotation and the second sheave face is asymmetric around the axis of rotation.

In some implementations of the present technology, the first sheave face is asymmetric around the axis of rotation and the second sheave face is asymmetric around the axis of rotation.

In some implementations of the present technology, separations measured at different radial distances from the axis of rotation along the axial direction between the first sheave face and the second sheave face vary non-linearly as the separations are measured at increasing radial distances from the axis of rotation.

In some implementations of the present technology, the drive pulley further comprises a spider axially fixed relative to the fixed sheave and rotationally fixed relative to the movable sheave, the movable sheave being disposed axially between the spider and the fixed sheave; a biasing member biasing the movable sheave axially away from the fixed sheave; and at least one actuator including an arm pivotally connected to one of the movable sheave and the spider, the arm being adapted to move the movable sheave axially toward the fixed sheave.

According to another aspect of the present technology, there is provided a vehicle comprising a frame; an engine connected to the frame, the engine having a plurality of pistons, the engine experiencing a cyclical displacement during operation; a driving shaft operatively connected to and driven by the engine; a continuously variable transmission having a drive pulley being operatively connected to and driven by the driving shaft, the drive pulley having a fixed sheave having a first sheave face, the fixed sheave being rotationally and axially fixed relative to the driving shaft, a movable sheave axially movable relative to the fixed sheave along an axis of rotation of the continuously variable transmission, the movable sheave having a second sheave face, and a separation between the first sheave face and the second sheave face, the separation being measured along an axial direction, at a constant radial distance from the axis of rotation, the axial direction being parallel to the axis of rotation, the separation varying around the axis of rotation, a driven pulley, a drive belt looped around the drive pulley and the driven pulley, and a driven shaft connected to and driven by the driven pulley; and at least one ground engaging member operatively connected to and driven by the driven shaft, the drive pulley being oriented angularly on the driving shaft such that a portion of the drive belt is in contact with the drive pulley at a maximum separation between the first sheave face and the second sheave when the engine experiences a maximum displacement of the cyclical displacement in a direction opposite the driven pulley.

In some implementations of the present technology, the maximum separation between the first sheave face and the second sheave is oriented angularly within 30 degrees of a line passing through a center of the drive pulley and a center of the driven pulley when the engine experiences the maximum displacement of the cyclical displacement in the direction opposite the driven pulley.

In some implementations of the present technology, the maximum separation between the first sheave face and the second sheave is generally aligned with a line passing through a center of the drive pulley and a center of the driven pulley when the engine experiences the maximum displacement of the cyclical displacement in the direction opposite the driven pulley.

In some implementations of the present technology, the engine experiences the maximum of the cyclical displacement in the direction opposite the driven pulley when a piston of the plurality of pistons that is farthest from the drive pulley is in a top dead center position.

In some implementations of the present technology, the first sheave face is asymmetric around the axis of rotation and the second sheave face is symmetric around the axis of rotation.

In some implementations of the present technology, the first sheave face is symmetric around the axis of rotation and the second sheave face is asymmetric around the axis of rotation.

In some implementations of the present technology, the first sheave face is asymmetric around the axis of rotation and the second sheave face is asymmetric around the axis of rotation.

In some implementations of the present technology, separations measured at different radial distances from the axis of rotation along the axial direction between the first sheave face and the second sheave face vary non-linearly as the separations are measured at increasing radial distances from the axis of rotation.

In some implementations of the present technology, the first sheave face is symmetric about an axis of symmetry and the axis of symmetry is skewed relative to the axis of rotation.

In some implementations of the present technology, the driving shaft is a crankshaft.

In some implementations of the present technology, the frame includes a tunnel; and the at least one ground engaging member is a drive track disposed at least in part under the tunnel; the vehicle further comprising at least one ski operatively connected to the frame; and a straddle seat disposed above the tunnel.

In some implementations of the present technology, the vehicle further comprises an alignment feature providing angular alignment of the drive pulley with respect to an angular position of the driving shaft.

In some implementations of the present technology, the alignment feature is a key, the key being disposed between the fixed sheave shaft and the driving shaft in a keyway defined at least in part in an interior of the fixed sheave shaft.

In some implementations of the present technology, an angle between the axis of rotation and at least one of the first sheave face and the second sheave face varies around the axis of rotation.

According to yet another aspect of the present technology, there is provided a drive pulley for a continuously variable transmission comprising a fixed sheave having a first sheave face; and a movable sheave axially movable relative to the fixed sheave along an axis of rotation of the continuously variable transmission, the movable sheave having a second sheave face, the fixed sheave and the movable sheave rotating about the axis of rotation, an angle between the axis of rotation and at least one of the first sheave face and the second sheave face varying around the axis of rotation.

According to yet another aspect of the present technology, there is provided a vehicle comprising a frame; an engine connected to the frame, the engine having at least one piston connected to an output shaft, the engine experiencing a cyclical displacement with respect to the frame during operation; a continuously variable transmission having a drive pulley being operatively connected to and driven by the output shaft, the drive pulley having a fixed sheave having a first sheave face, the fixed sheave being rotationally and axially fixed relative to the output shaft, a movable sheave axially movable relative to the fixed sheave along an axis of rotation of the continuously variable transmission, the movable sheave having a second sheave face, the fixed sheave and the movable sheave rotating about the axis of rotation, a separation between the first sheave face and the second sheave face, the separation being measured along an axial direction at a constant radial distance from the axis of rotation, the axial direction being parallel to the axis of rotation, the separation varying around the axis of rotation, a driven pulley, and a drive belt looped around the drive pulley and the driven pulley, the drive pulley being oriented angularly on the driving shaft such that a portion of the drive belt is in contact with the drive pulley at a maximum separation between the first sheave face and the second sheave, the portion of the drive belt being in contact with the drive pulley at the maximum separation when the maximum separation is generally aligned with a line passing through a center of the drive pulley and a center of the driven pulley, and the at least one piston is in a top dead center position.

In some implementations of the present technology, the at least one piston is at least two pistons.

In some implementations of the present technology, the one of the at least two pistons that is in a top dead center position is a piston of the at least two pistons that is farthest away from the drive pulley.

In some implementations of the present technology, the first sheave face is asymmetric around the axis of rotation and the second sheave face is symmetric around the axis of rotation.

In some implementations of the present technology, the first sheave face is symmetric around the axis of rotation and the second sheave face is asymmetric around the axis of rotation.

In some implementations of the present technology, the first sheave face is symmetric about an axis of symmetry and the axis of symmetry is skewed relative to the axis of rotation.

In some implementations of the present technology, the first sheave face is asymmetric around the axis of rotation and the second sheave face is asymmetric around the axis of rotation.

In some implementations of the present technology, separations measured at different radial distances from the axis of rotation along the axial direction between the first sheave face and the second sheave face vary non-linearly as the separations are measured at increasing radial distances from the axis of rotation.

According to yet another aspect of the present technology, there is provided a vehicle comprising a frame; an engine connected to the frame, the engine having at least one piston connected to an output shaft, the engine experiencing a cyclical displacement with respect to the frame during operation; a continuously variable transmission having a drive pulley being operatively connected to and driven by the output shaft, the drive pulley having a fixed sheave having a first sheave face, the fixed sheave being rotationally and axially fixed relative to the output shaft, a movable sheave axially movable relative to the fixed sheave along an axis of rotation of the continuously variable transmission, the movable sheave having a second sheave face, the fixed sheave and the movable sheave rotating about the axis of rotation, and a separation between the first sheave face and the second sheave face, the separation being measured along an axial direction at a constant radial distance from the axis of rotation, the axial direction being parallel to the axis of rotation, the separation varying around the axis of rotation to have a minimum separation and a maximum separation, a driven pulley, and a drive belt looped around the drive pulley and the driven pulley, the maximum separation being orientated with respect to the output shaft to minimize pulling forces of the drive belt on the driven pulley due to unbalanced moments and forces of rotating components of the engine.

In some implementations of the present technology, the maximum separation is generally aligned with a line passing through a center of the drive pulley and a center of the driven pulley when the engine experiences a maximum displacement of the cyclical displacement in the direction opposite the driven pulley.

In some implementations of the present technology, the engine experiences the maximum of the cyclical displacement in the direction opposite the driven pulley when a piston of the plurality of pistons that is farthest from the drive pulley is in a top dead center position.

For the purposes of the present application, terms related to spatial orientation such as forward, rearward, front, rear, upper, lower, left, and right, are as they would normally be understood by a driver of the snowmobile sitting thereon in a normal driving position with the vehicle being upright and steered in a straight ahead direction.

Should there be contradictions between the definitions of terms provided in documents incorporated herein by reference and definitions of such terms provided in the present application, the definitions in the present application prevail.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 13 is a front, right perspective view of a movable sheave and a crankshaft of the drive pulley of FIG. 12;

FIG. 14 is a front elevation cross-sectional view of yet another different implementation of a drive pulley of the CVT; and FIG. 15 is a front elevation cross-sectional view of yet another different implementation of a drive pulley of the CVT.

DETAILED DESCRIPTION

A drive pulley for a continuously variable transmission (CVT) will be described with respect to a snowmobile 10. However, it is contemplated that the drive pulley could be used in a CVT for other vehicles, such as, but not limited to, on-road vehicles, off-road vehicles, a motorcycle, a scooter, a three-wheel road vehicle and an all-terrain vehicle (ATV). It is also contemplated that the CVT could be used in devices other than vehicles.

Figure 1:
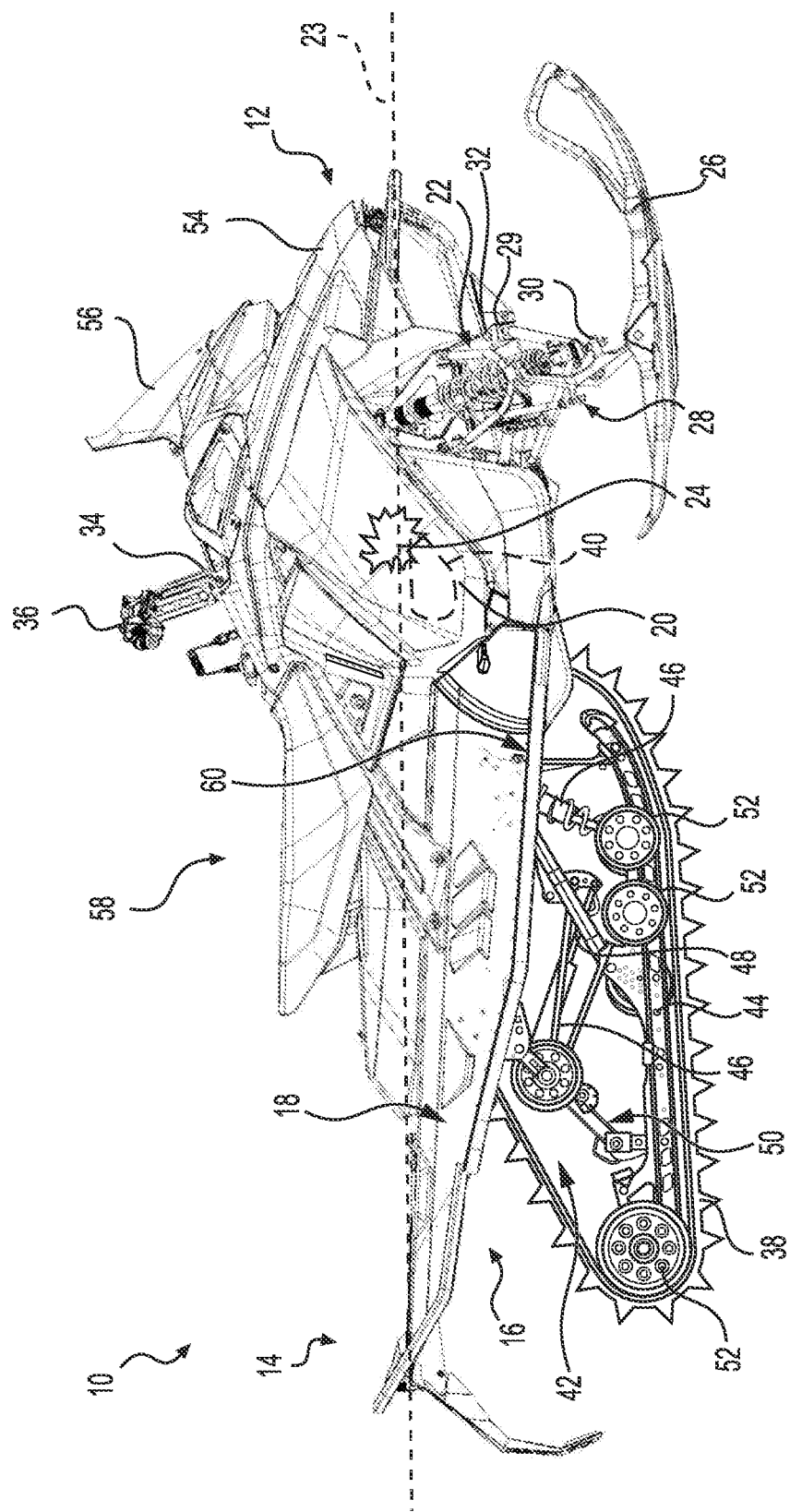
FIG. 1 is a right perspective view of a snowmobile.

Turning now to FIG. 1, a snowmobile 10 includes a forward end 12 and a rearward end 14 that are defined consistently with a forward travel direction of the snowmobile 10. The snowmobile 10 includes a frame 16 that includes a tunnel 18, a motor cradle portion 20 and a front suspension assembly portion 22. The tunnel 18 consists of one or more pieces of sheet metal arranged to form an inverted U-shape that is connected at the front to the motor cradle portion 20 and extends rearward therefrom along a longitudinal axis 23. A motor, which in the present implementation is an internal combustion engine 24 (schematically illustrated in FIG. 1), is carried by the motor cradle portion 20 of the frame 16. The internal construction of the engine 24 may be of any known type such as a two-stroke engine, a four-stroke engine or a diesel engine. It is contemplated that the engine 24 could be replaced by other types of motors, such as, but not limited to, an electric/internal combustion hybrid engine. Two skis 26 are positioned at the forward end 12 of the snowmobile 10 and are attached to the front suspension assembly portion 22 of the frame 16 through a front suspension assembly 28. The front suspension assembly 28 includes shock absorber assemblies 29, ski legs 30 and supporting arms 32. Ball joints and steering rods (not shown) operatively connecting the skis 26 to a steering column 34. A steering device in the form of handlebar 36 is attached to the upper end of the steering column 34 to allow a driver to rotate the ski legs 30 and thus the skis 26, in order to steer the snowmobile 10.

An endless drive track 38 is disposed generally under the tunnel 18 and is operatively connected to the engine 24 through a CVT 40 (schematically illustrated by broken lines in FIG. 1) which will be described in greater detail below. The endless drive track 38 is driven to run about a rear suspension assembly 42 for propulsion of the snowmobile 10. The rear suspension assembly 42 includes a pair of slide rails 44 in sliding contact with the endless drive track 38. The rear suspension assembly 42 also includes a plurality of shock absorbers 46 which may further include coil springs (not shown) surrounding the shock absorbers 46. Suspension arms 48 and 50 are provided to attach the slide rails 44 to the frame 16. A plurality of idler wheels 52 are also provided in the rear suspension assembly 42. Other types and geometries of rear suspension assemblies are also contemplated.

At the forward end 12 of the snowmobile 10, fairings 54 enclose the engine 24 and the CVT 40, thereby providing an external shell that protects the engine 24 and the CVT 40. The fairings 54 include a hood and one or more side panels that can be opened to allow access to the engine 24 and the CVT 40 when this is required, for example, for inspection or maintenance of the engine 24 and/or the CVT 40. A windshield 56 is connected to the fairings 54 near the forward end 12 of the snowmobile 10. Alternatively the windshield 56 could be connected directly to the handlebar 36. The windshield 56 acts as a wind screen to lessen the force of the air on the driver while the snowmobile 10 is moving forward.

A straddle-type seat 58 is positioned over the tunnel 18. Two footrests 60 are positioned on opposite sides of the snowmobile 10 below the seat 58 to accommodate the driver's feet.

Figure 2:
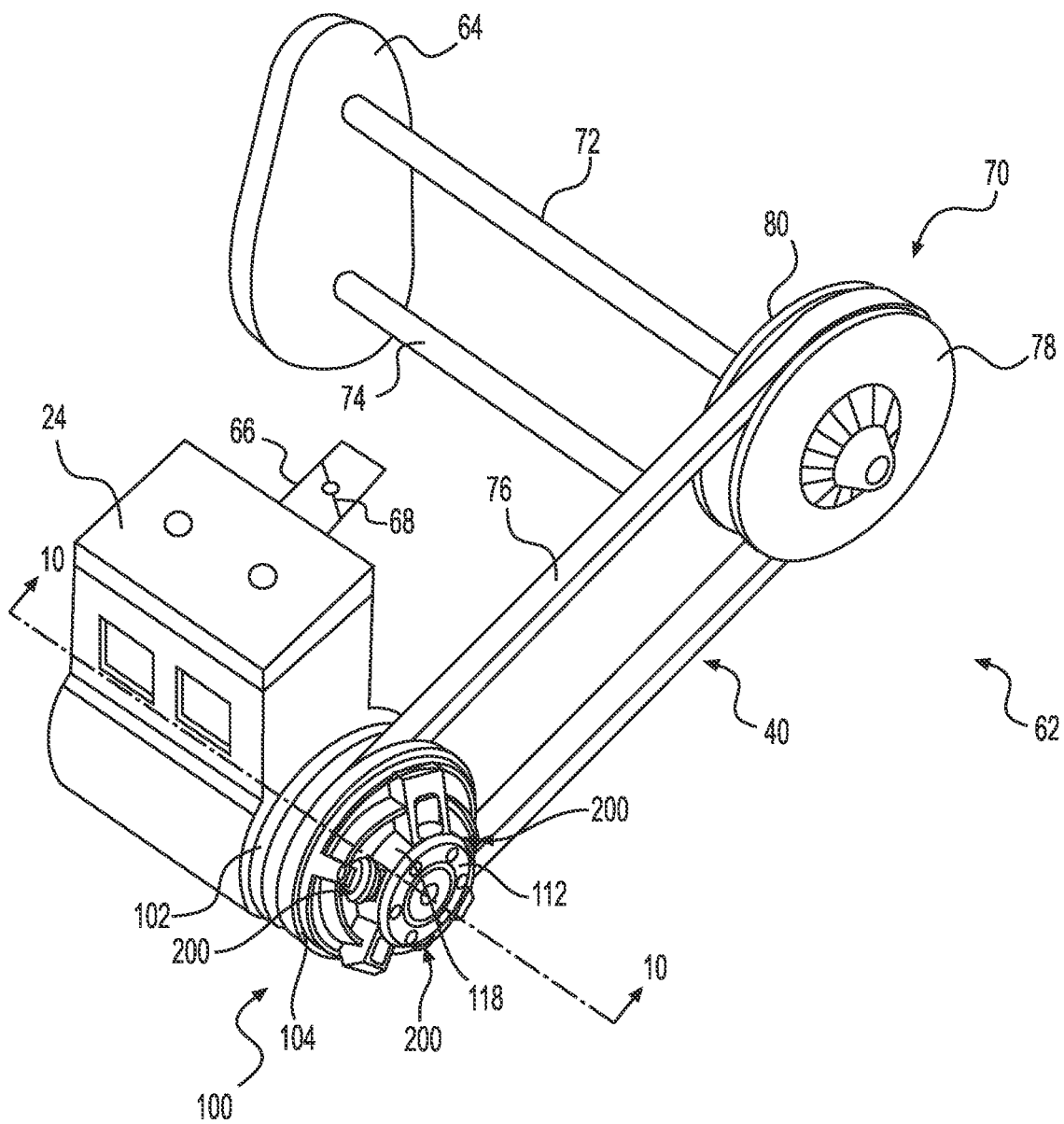
FIG. 2 is schematic representation of a perspective view, taken from a front, left side, of a powertrain of the snowmobile of FIG. 1.

FIG. 2 schematically illustrates a powertrain 62 of the snowmobile 10. The powertrain 62 includes the engine 24, the CVT 40 and a fixed ratio reduction drive 64. A throttle body 66 having a throttle valve 68 therein is connected to air intake ports of the engine 24 to control the flow of air to the engine 24. It is contemplated that the throttle body 66 could be replaced by a carburetor. The engine 24 drives a crankshaft 90 (see FIG. 6) that rotates about an axis of rotation 190 that extends generally transversely to the longitudinal axis 23 of the snowmobile 10. The crankshaft 90 drives the CVT 40 for transmitting torque to the endless drive track 38 for propulsion of the snowmobile 10. The CVT 40 includes a drive pulley 100 coupled to the crankshaft 90 to rotate with the crankshaft 90 of the engine 24 and a driven pulley 70 coupled to one end of a transversely mounted countershaft 72 that is supported on the frame 16 through bearings (not shown). The opposite end of the transversely mounted countershaft 72 is connected to the input member of the reduction drive 64 and the output member of the reduction drive 64 is connected to a drive axle 74 carrying sprocket wheels (not shown) that form a driving connection with the drive track 38.

The drive pulley 100 of the CVT 40 includes a pair of opposed generally frustoconical belt drive sheaves 102 and 104 between which a drive belt 76 is located. The drive belt 76 is made of rubber, but it is contemplated that it could be made of metal linkages or of a polymer. The drive pulley 100 will be described in greater detail below. The driven pulley 70 includes a pair of frustoconical belt drive sheaves 78 and 80 between which the drive belt 76 is located. As can be seen, the drive belt 76 is looped around both the drive pulley 100 and the driven pulley 70. The torque being transmitted to the driven pulley 70 provides the necessary clamping force on the drive belt 76 through its torque sensitive mechanical device in order to efficiently transfer torque to the other powertrain components.

In the present implementation, the drive pulley 100 rotates at the same speed as the crankshaft 90 of the engine 24 whereas the speed of rotation of the transversely mounted countershaft 72 is determined in accordance with the instantaneous ratio of the CVT 40, and the drive axle 74 rotates at a lower speed than the transversely mounted countershaft 72 because of the action of the reduction drive 64. The input member of the reduction drive 64 consists of a small sprocket connected to the transversely mounted countershaft 72 and coupled to drive an output member consisting of a larger sprocket connected to the drive axle 74 through a driving chain, all enclosed within the housing of the reduction drive 64.

It is contemplated that the drive pulley 100 could be coupled to an engine shaft other than the crankshaft 90, such as an output shaft, a counterbalance shaft, or a power take-off shaft driven by the engine 24. The shaft driving the drive pulley 100 is therefore generally referred to herein as the driving shaft 90. Similarly, it is contemplated that the driven pulley 70 could be coupled to a shaft other than the transversely mounted countershaft 72, such as directly to the drive axle 74 or any other shaft operatively connected to the propulsion element of the vehicle (i.e. the drive track 38 in the case of the snowmobile 10). The shaft driven by the driven pulley 70 is therefore generally referred to herein as the driven shaft 72.

Additional details on similar continuously variable transmissions can be found in International Patent Publication No. WO 2015/151032 A1, published Oct. 8, 2015, the entirety of which is incorporated herein by reference.

Turning now to FIGS. 3 to 6, the drive pulley 100 according to one non-limiting implementation of the present technology will be described in more detail. It should be noted that the drive pulley 100 is an exemplary drive pulley 100, and many other implementations in accordance with the present technology are contemplated. As discussed above, the drive pulley 100 includes a pair of opposed generally frustoconical belt drive sheaves 102 and 104. Both sheaves 102 and 104 rotate together with the driving shaft 90. The sheave 102 is fixed in an axial direction relative to the driving shaft 90, and is therefore referred to as the fixed sheave 102. The fixed sheave 102 is also rotationally fixed relative to the driving shaft 90. The sheave 104 can move toward or away from the fixed sheave 102 in the axial direction of the driving shaft 90 in order to change the drive ratio of the CVT 40, and is therefore referred to as the movable sheave 104. As can be seen in FIG. 2, the fixed sheave 102 is disposed between the movable sheave 104 and the engine 24.

Figure 6:
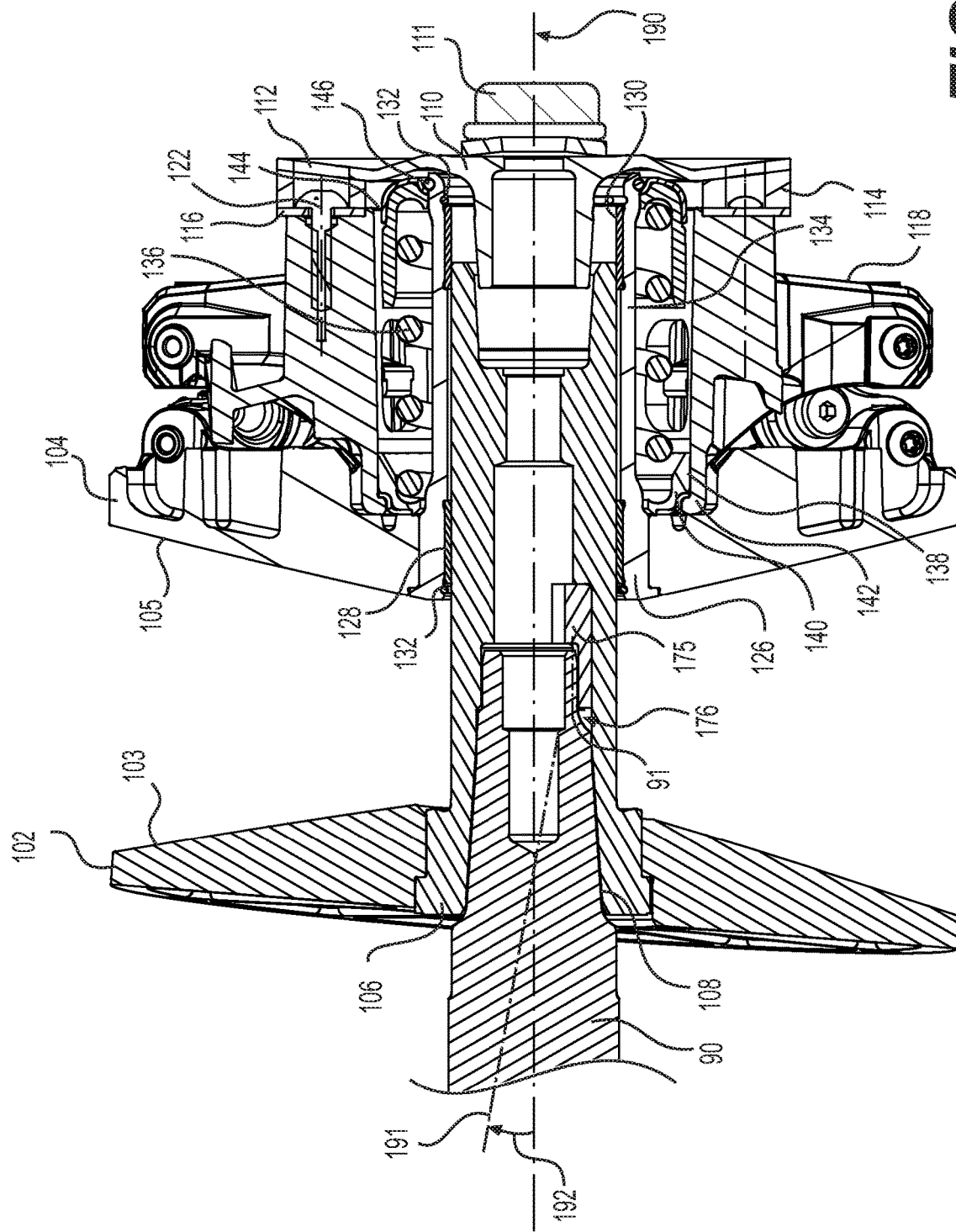
FIG. 6 is a cross-sectional view of the drive pulley of FIG. 3 taken through line 6-6 of FIG. 3, with the drive pulley in an opened position.

The fixed sheave 102 is mounted on a fixed sheave shaft 106. The fixed sheave 102 is press-fitted on the fixed sheave shaft 106 such that the fixed sheave 102 rotates with the fixed sheave shaft 106. It is contemplated that the fixed sheave 102 could be connected to the fixed sheave shaft 106 in other known manners to make the fixed sheave 102 rotationally and axially fixed relative to the fixed sheave shaft 106. As can be seen in FIG. 6, the fixed sheave shaft 106 is hollow and has a tapered hollow portion 108. The tapered hollow portion 108 receives the end of the driving shaft 90 (as shown in FIG. 6) therein to transmit torque from the engine 24 to the drive pulley 100.

Due to a rotationally asymmetric form of the drive pulley 100, discussed in more detail below, an angular orientation of the drive pulley 100 with respect to an angular position of the driving shaft 90 is provided during installation or replacement of the drive pulley 100 by an alignment feature. In the present implementation, the alignment feature is a key 175 disposed in a keyway 176 (FIG. 6). A part of the keyway 176 is formed in the hollow portion 108 of the fixed sheave shaft 106. An end portion 91 of the driving shaft 90 also forms a portion of the keyway 176 in order to accept the key 175. In order for the drive pulley 100 and the driving shaft 90 to be assembled together in the presence of the key 175, the drive pulley 100 must be mounted on the driving shaft 90 at a predetermined angular orientation.

It is contemplated that the key 175 and keyway 176 could be differently shaped. It is also contemplated that an alignment feature other than the key 175 in the keyway 176 could be used to aid in the alignment of the drive pulley 100 relative to the driving shaft 90. Alternative implementations of an alignment feature in accordance with the present technology could include, but are not limited to, asymmetric splines, a drive shaft and fixed sheave shaft of interlocking polygonal shapes, and lines to be matched marked on the exterior surfaces of the shafts. One alternative implementation of an alignment feature in accordance with the present technology, where a driving shaft 490 includes a flat end portion 470, is described below with respect to a drive pulley 400.

A fastener 111 is inserted in the outer end (i.e. the right side with respect to FIG. 6) of the drive pulley 100, inside the fixed sheave shaft 106, and screwed into the end of the driving shaft 90 to prevent axial displacement of the fixed sheave shaft 106 relative to the driving shaft 90. It is contemplated that the fixed sheave shaft 106 could be connected to the driving shaft 90 in other known manners to make the fixed sheave shaft 106 rotationally and axially fixed relative to the driving shaft 90. It is also contemplated that the driving shaft 90 could be the fixed sheave shaft 106.

A cap 110 is taper-fitted in the outer end of the fixed sheave shaft 106. The fastener 111 used to connect the driving shaft 90 to the fixed sheave shaft 106 is also inserted through the cap 110 to connect the cap 110 to the fixed sheave shaft 106. It is contemplated that the cap 110 could be connected to the fixed sheave shaft 106 by other means. The radially outer portion of the cap 110 forms a ring 112. An annular rubber damper 114 is connected to the ring 112. Another ring 116 is connected to the rubber damper 114 such that the rubber damper 114 is disposed between the rings 112, 116. As can be seen in FIG. 6, the rubber damper 114 and the ring 116 are disposed radially outward of the fixed sheave shaft 106. In the present implementation, the rubber damper 114 is vulcanized to the rings 112, 116, but it is contemplated that they could be connected to each other by other means such as by using an adhesive. It is also contemplated that the damper 114 could be made of a material other than rubber.

Figure 3:
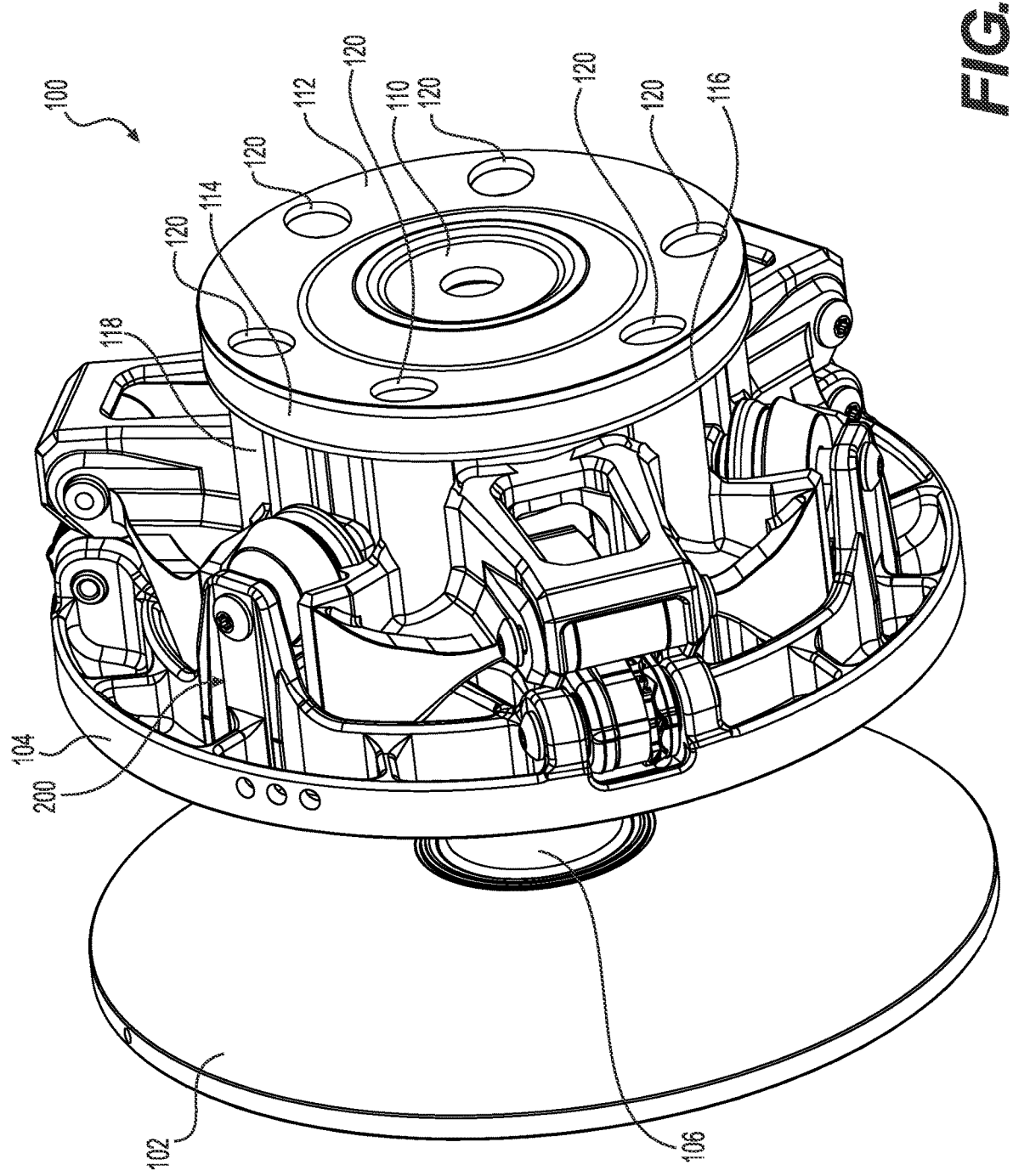
FIG. 3 is a perspective view, taken from a bottom, front, left side of a drive pulley of a CVT of the powertrain of FIG. 2, with the drive pulley in an opened position.
Figure 4:
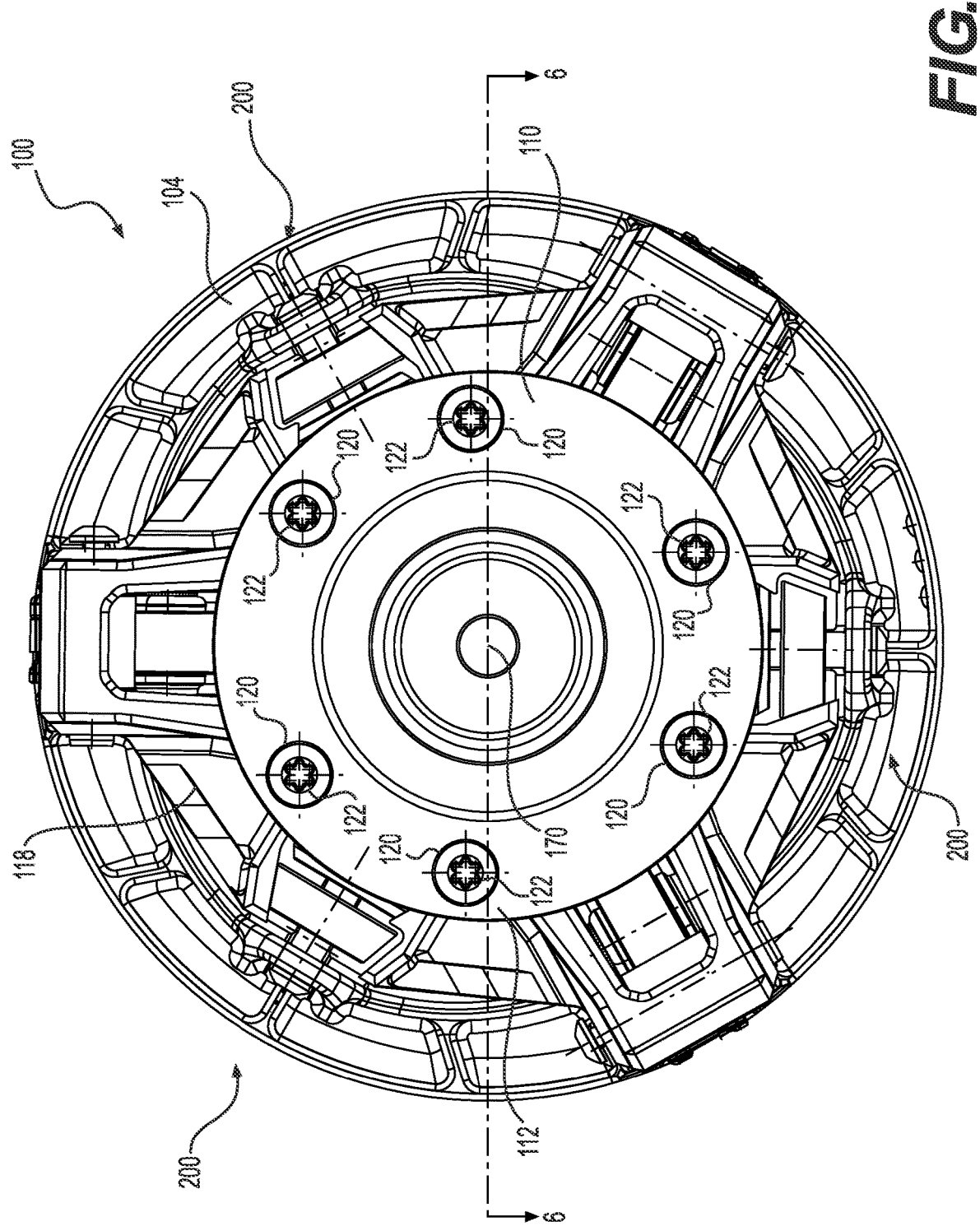
FIG. 4 is a left side elevation view of the drive pulley of FIG. 3, with the drive pulley in an opened position.

A spider 118 is disposed around the fixed sheave shaft 106 and axially between the ring 116 and the movable sheave 104. The spider 118 is axially fixed relative to the fixed sheave 102. As can be seen in FIGS. 3 and 4, six apertures 120 are formed in the ring 112 and the damper 114. The ring 116 has six corresponding apertures (not shown). Six fasteners 122 (FIG. 4) are inserted through the apertures 120, through the ring 116 and into apertures (not shown) of the spider 118 to fasten the ring 116 to the spider 118. As a result, torque is transferred between the fixed sheave shaft 106 and the spider 118 via the cap 110, the rubber damper 114 and the ring 116. The damper 114 dampens the torque variations from the fixed sheave shaft 106 resulting from the combustion events in the engine 24. The spider 118 therefore rotates with the fixed sheave shaft 106.

As can be seen in FIG. 6, a movable sheave shaft 126 is disposed around the fixed sheave shaft 106. The movable sheave 104 is press-fitted on the movable sheave shaft 126 such that the movable sheave 104 rotates and moves axially with the movable sheave shaft 126. It is contemplated that the movable sheave 104 could be connected to the movable sheave shaft 126 in other known manners to make the movable sheave 104 rotationally and axially fixed relative to the shaft 126. It is also contemplated that the movable sheave 104 and the movable sheave shaft 126 could be integrally formed. Two bushings 128, 130 are disposed radially between and abut the movable sheave shaft 126 and the fixed sheave shaft 106. The bushings 128, 130 are disposed adjacent opposite ends of the movable sheave 126. Clips 132 prevent the bushing 128, 130 from moving axially relative to the movable sheave shaft 126. As such, as the movable sheave 104, and therefore the movable sheave shaft 126, moves axially relative to the fixed sheave shaft 106, the bushings 128, 130 move axially together with the movable sheave shaft 126 and therefore move axially relative to the fixed sheave shaft 106. The bushings 128, 130 are made of a relatively low friction material thereby permitting easy axial movement of the movable sheave shaft 126 along the fixed sheave shaft 106. Examples of low friction material include, but are not limited to, brass and polyoxymethylene.

As can also be seen in FIG. 6, an annular space 134 is defined between the bushings 128, 130, the movable sheave shaft 126 and the fixed sheave shaft 106. As can be seen, no component of the drive pulley 100 is disposed inside this space 134. As such, the annular space 134 extends continuously between the bushing 128, 130. Therefore, the construction of the illustrated implementation allows the length of the bushings 128, 130 in the axial direction to be selected in order to achieve a desired balance between the amount of friction generated by the bushings 128, 130 in the axial direction and their resistance to wear. For example, the bushings 128, 130 could be longer than illustrated. It is also contemplated that a single bushing or more than two bushings could be provided radially between the shafts 106, 126.

To transmit torque from the spider 118 to the movable sheave 104, a torque transfer assembly consisting of three roller assemblies 200 connected to the movable sheave 104 is provided. The roller assemblies 200 are disposed radially outward of the fixed and movable sheave shafts 106, 126. The roller assemblies 200 engage the spider 118 so as to permit low friction axial displacement of the movable sheave 104 relative to the spider 118 and to eliminate, or at least minimize, rotation of the movable sheave 104 relative to the spider 118. As described above, torque is transferred from the fixed sheave 106 to the spider 118 via the damper 114. The spider 118 engages the roller assemblies 200 which transfer the torque to the movable sheave 104 with no, or very little, backlash. As such, the spider 118 is considered to be rotationally fixed relative to the movable sheave 104. The three roller assemblies 200 are disposed at 120 degrees from each other. It is contemplated that the roller assemblies 200 could be connected to the spider 118 and engage the movable sheave 104. It is contemplated that in some implementations, the torque transfer assembly could have more or less than three roller assemblies 200. It is contemplated that the roller assemblies 200 could be omitted and torque could be transferred to the movable sheave 104 and movable sheave shaft 126 by a different mechanism.

As can be seen in FIG. 6, a biasing member in the form of a coil spring 136 is disposed inside a cavity 138 defined radially between the movable sheave shaft 126 and the spider 118. At one end, the spring 136 abuts a fixed spring seat 140. The spring 136 biases the fixed spring seat 140 against a lip 142 of the spider 118, and therefore the fixed spring seat 140 is axially fixed relative to the spider 118. At the opposite end, the spring 136 abuts a movable spring seat 144. The movable spring seat 144 is held in place near the end of the movable sheave shaft 126 by the spring 136 and a C-clip 146 engaging the movable sheave shaft 126, thereby making the movable spring seat 144 axially fixed relative to the movable sheave shaft 126. As a result, this end of the spring 136 (i.e. the right end with respect to FIG. 6) and the movable spring seat 144 move axially relative fixed sheave shaft 106 when the movable sheave 104 and the movable sheave shaft 126 move axially. As the movable sheave 104 and the movable sheave shaft 126 move axially toward the fixed sheave 102, the spring 136 gets compressed. The spring 136 biases the movable sheave 104 and the movable sheave shaft 126 away from the fixed sheave 102 toward their position shown in FIG. 6. It is contemplated that, in some implementations, the movable sheave 104 could be biased away from the fixed sheave 102 by mechanisms other than the spring 136. As can be seen in FIG. 6, the bushing 128 is disposed axially between the spring 136 and the fixed sheave 102 and the bushing 130 is disposed in part axially between the ends of the spring 136.

Additional detail regarding a general operation of the drive pulley 100 using centrifugal actuators can be found in International Application Publication No. WO2013/032463 A2, published Mar. 7, 2013, the entirety of which is incorporated herein by reference. It is contemplated that the drive pulley 100 could also be operated using pneumatic or hydraulic actuators, depending on the specific implementation.

The movable sheave 104 and the fixed sheave 102 of the drive pulley 100 in accordance with the present technology will now be described in more detail with respect to FIGS. 5 and 6.

The drive pulley 100 has two sheave faces that the drive belt 76 contacts during standard operation: a sheave face 103 of the fixed sheave 102 and a sheave face 105 of the movable sheave 104. Due to their generally frusticonical form, the axial distance between the sheave faces 103, 105 varies at different radial distances from the axis of rotation 190. The relative axial distance between the sheave faces 103, 105 also varies at different speeds of rotation due to axial movement of the movable sheave 104. In the present implementation, for a given radius and a given position of the movable sheave 104 along the axis 190, the axial distance separating the two sheave faces 103, 105 also varies around the axis of rotation 190. This will be illustrated by inspecting the separation of the two faces 103, 105 at a given radius at two locations around the axis of rotation 190 for a given position of the sheave 104 along the axis 190, as seen in FIG. 5.

A first separation 185, for example, is measured between the two sheave faces 103, 105 at a radius 179. A second separation 186 is measured opposite the separation 185, at the same radius 179. As can be seen, the second separation 186, illustrated at the bottom of FIG. 5, is larger than the first separation 185. The separation 185, being the smaller separation, is referred to herein as a minimum separation 185. Likewise the separation 186 is the larger separation between the sheave faces 103, 105 and is referred to herein as a maximum separation 186. It should be noted that the choice of radius 179 and relative position of the sheaves 102, 104 is an illustrative example. The asymmetrical axial separation of the sheave faces 103, 105 is independent of the radius 179 or relative position of the sheaves 102, 104.

To gain a better understanding of the different separations 185, 186, the separations 185, 186 can be divided into portions measured from a line 181 perpendicular to the axis of rotation 190 to each of the sheave faces 103, 105. The separation 185 is a combination of a portion 180 from the sheave face 105 to the perpendicular line 181, and a portion 182 from the perpendicular line 181 to the sheave face 103 of the fixed sheave 102. Similarly, the separation 186 is a combination of the portion 180 from the sheave face 105 to the perpendicular line 181, and a portion 184 from the perpendicular line 181 to the sheave face 103 of the fixed sheave 102. The portion 180 measured from the line 181 to the sheave face 105 of the movable sheave 104 is the same for the separations 185 and 186 and is constant around the axis of rotation 190 for a given radius 179 from the axis 190. In other words, the sheave face 105 of the movable sheave 104 is symmetric about the axis of rotation 190.

Upon examination of the portions 182, 184 of the separations 185, 186 measured from the line 181 to the sheave face 103 of the fixed sheave 102, it can be seen that the portion 184 is larger than the portion 182. Thus the varying separation between the sheave faces 103, 105 is due to the fixed sheave 102, the sheave face 103 being asymmetrically distant from the sheave face 105 of the movable sheave 104 around the axis of rotation 190.

The varying separation between the sheave face 103, 105 can alternatively be described by comparing an angle 188 between the axis of rotation 190 and the sheave face 103 to a similarly measured angle 189 at a location opposite the angle 188. It can be seen that the angle 188 is larger than the angle 189, and thus the sheave face 103 tilts farther away from the sheave face 105 of the movable sheave 104 at that location than at the location opposite where angle 189 is measured. Thus the variation between the separations 185, 186 between the two sheave faces 103, 105 can be described in terms of an angle being measured between the sheave face 103 and the axis of rotation 190 varying around the axis of rotation 190.

While the distance between the sheave faces 103, 105 is asymmetric around the axis of rotation 190, the sheave face 103 is not itself asymmetric. The sheave face 103 is symmetric about an axis of symmetry 191, but the axis of symmetry 191 is skewed at an angle 192 relative to the axis of rotation 190. Thus the sheave face 103 is angled such that a distance measured at the radius 179 will vary depending on where around the axis of rotation 190 the distance is measured. It is contemplated that in some implementations, rather than being symmetric but skewed to the axis of rotation 190, the fixed sheave 102 could be aligned with but asymmetric around the axis of rotation 190.

As described above in relation to FIG. 2, during operation the drive belt 76 is looped around the drive pulley 100. At a given rotation speed of the drive pulley 100, the drive belt 76 contacts the sheave faces 103, 105 at a distance relative to the axis of rotation 190 that depends on the separation of the sheave faces 103, 105. The drive belt 76, having a fixed width, contacts the sheave faces 103, 105 at the radial distance from the axis of rotation 190 where the two edges of the drive belt 76 contact the sheave faces 103, 105. Thus, the drive belt 76 contacts the sheave faces 103, 105 where their axial separation matches the drive belt width. For example, when the drive pulley 100 is in an open position and the movable sheave 104 is far from the fixed sheave 102, the drive belt 76 will contact the sheave faces 103, 105 near the axis of rotation 190, as the separation of the sheave faces 103, 105 that matches the drive belt width is near the axis of rotation 190. When the drive pulley 100 is in a more closed position and the movable sheave 104 is near the fixed sheave 102, the drive belt 76 will contact the sheave faces 103, 105 farther from the axis of rotation 190, as the separation of the sheave faces 103, 105 that matches the drive belt width is farther from the axis of rotation 190.

Due to the asymmetric nature of the axial distance between the sheave faces 103, 105 for a given axial position of the movable sheave 104 relative to the fixed sheave 102, the radial distance from the axis of rotation 190 at which the drive belt 76 contacts the sheave faces 103, 105 varies as the drive pulley 100 rotates at a constant rotation speed. When the drive pulley 100 is oriented such that the portion of the drive belt 76 contacting the sheave faces 103, 105 is near the position of the maximum separation 186, the drive belt 76 is nearer to the axis of rotation 190. As the drive pulley 100 turns, the drive belt 76 will get radially farther away from the axis of rotation 190, until the drive pulley 100 has turned 180 degrees and the drive belt 76 is contacting the sheave faces 103, 105 near the minimum separation 185. As the drive pulley 100 continues to turn, the drive belt 76 will once again get nearer the axis of rotation 190, until it is back to its nearest point where the portion of the drive belt 76 contacting the sheave faces 103, 105 is at the angular position of the maximum separation 186. During operation, this cyclical movement of the drive belt 76 relative to the axis of rotation 190 continues so long as the drive pulley 100 rotates.

Figure 7:
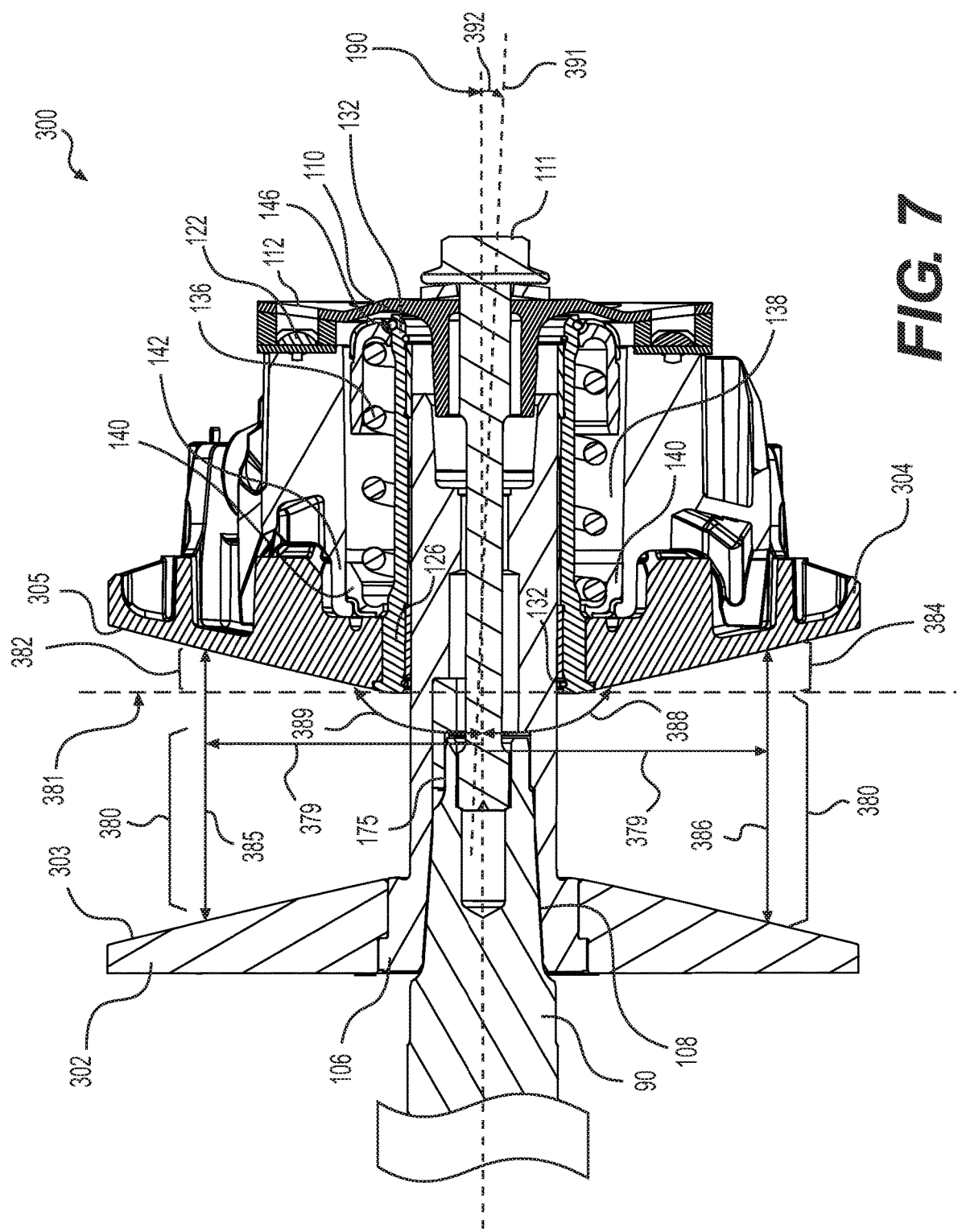
FIG. 7 is a front elevation cross-sectional view of a different implementation of a drive pulley of the CVT.

Another implementation of a drive pulley 300 in accordance with the present technology is illustrated in FIG. 7. Elements of the drive pulley 300 that are similar to those of the drive pulley 100 retain the same reference numeral.

The drive pulley 300 includes a fixed sheave 302 having a sheave face 303. The drive pulley 300 also includes a movable sheave 304 having a sheave face 305. Similarly to drive pulley 100 described above, at a given radius 379, a distance measured between the two sheave faces 303, 305 varies around the axis of rotation 190. As seen in FIG. 7, two representative separations, 385 and 386, are measured for illustrative purposes at two points opposite one another, at the same given radius 379. The first separation 385 at the given radius 379 is larger than the second separation 386 at the same radius 379.

Figure 5:
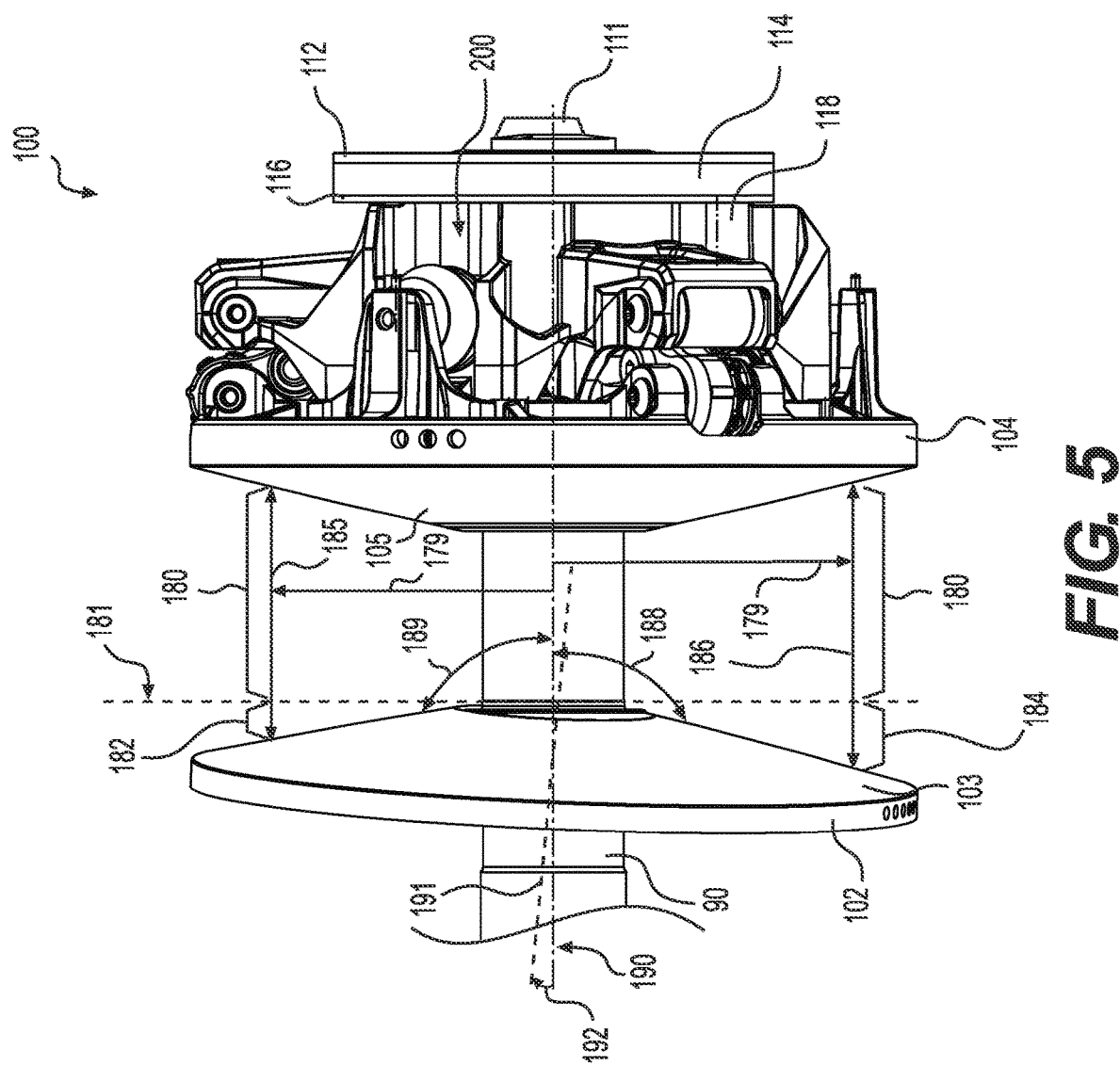
FIG. 5 is a front elevation view of the drive pulley of FIG. 3, with the drive pulley in an opened position.

Similarly to the discussion above with respect to FIGS. 5 and 6, the separations 385 and 386 can be divided into portions measured from a line 381 perpendicular to the axis of rotation 190 to each of the sheave faces 303, 305. In this implementation, a portion 380 measured from the line 381 to the sheave face 303 of the fixed sheave 302 is the same for the separations 385, 386. In other words, the sheave face 303 of the fixed sheave 302 is symmetric about the axis of rotation 190. Contrarily, the portion 382 measured from the perpendicular line 381 to the sheave face 305 of the movable sheave 304 is larger than the portion 384. Thus in this implementation, the varying distance between the sheave faces 303, 305 at a given radius, such as radius 379, is due to the sheave face 305 of the movable sheave 304, which is asymmetric around the axis of rotation 190.

The varying separation between the sheave face 303, 305 can again be alternatively described by comparing an angle 388 between the axis of rotation 190 and the sheave face 303 to a similarly measured angle 389 at a location opposite the angle 388. It can be seen that the angle 389 is larger than the angle 388, and thus the sheave face 305 tilts farther away from the sheave face 303 at that location than at the location opposite where angle 388 is measured. Thus the variation between the separations 385, 386 between the two sheave faces 303, 305 can be described in terms of an angle being measured with between the sheave face 303 and the axis of rotation 190 varying around the axis of rotation 190. Similar to the fixed sheave face 103 described above, the movable sheave face 305 is symmetric about an axis of symmetry 391, but the axis of symmetry 391 is skewed at an angle 392 relative to the axis of rotation 190. Thus the sheave face 305 is angled such that a distance measured at the radius 379 will vary depending on where around the axis of rotation 190 the distance is measured.

In addition, it is contemplated that a combination of the drive pulleys 100 and 300 could be used. For example, a drive pulley composed of both the sheave face 103 of the fixed sheave 102 of drive pulley 100 and the sheave face 305 of the movable sheave 304 of the drive pulley 300 could be implemented according to the present technology.

Figure 8:
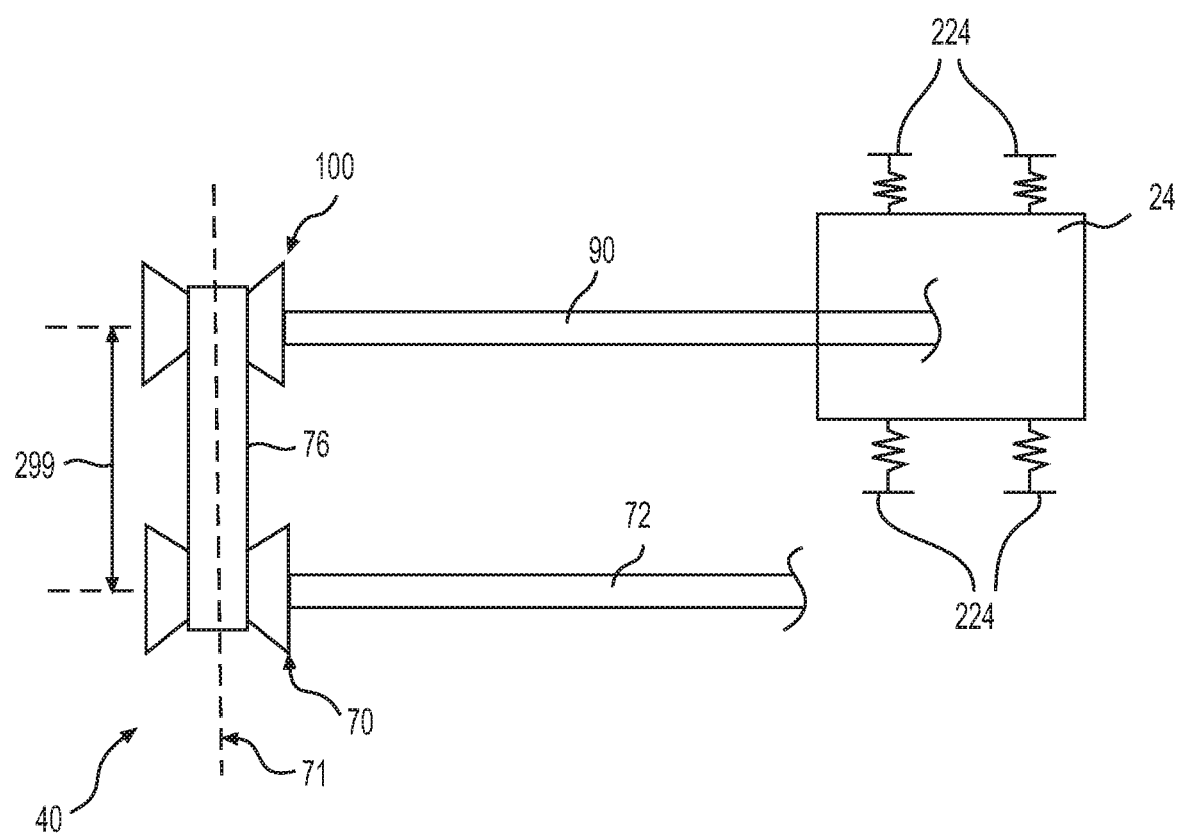
FIG. 8 is a schematic drawing of the CVT and engine, at a one point in the engine cycle.
Figure 9:
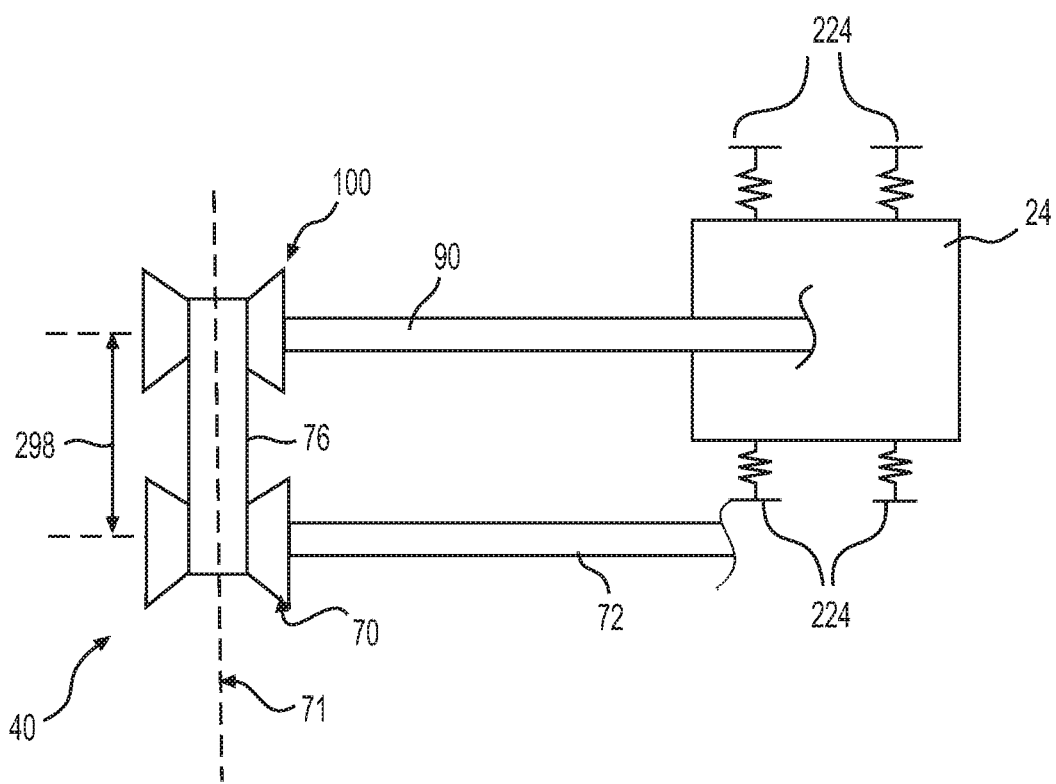
FIG. 9 is the CVT and engine of FIG. 8, at another point in the engine cycle.

Further detail concerning the implementation of the varying separation between the sheave faces 103, 105 will now be discussed with respect to FIGS. 8 and 9. For simplicity only drive pulley 100 will be discussed, but the discussion also applies to the drive pulley 300. FIGS. 8 and 9 are simplified schematic representations of the engine 24 and CVT 40, at two different points in an engine cycle.

The engine 24 is at least partially vibrationally isolated from the frame 16 by vibration isolators (not shown), which are symbolically represented in FIGS. 8 and 9 as springs 224. As a result, the connected driving shaft 90 and the drive pulley 100 are likewise at least partially vibrationally isolated from the frame 16. During operation, the engine 24, the driving shaft 90 and the drive pulley 100 experience a cyclical displacement with respect to the frame 16, the cycle of the displacement corresponding to one operational cycle of the engine 24. It is contemplated that the cyclical displacement could be related to any number of unbalanced moments and forces of rotating components of the engine 24. At least part of this cyclical displacement occurs along a line 71 passing through a center 77 of the driven pulley 70 and a center 79 of the driven shaft 72, along an axis of the drive belt 76 (see FIG. 11). The driven pulley 70 and the driven shaft 72 are not connected to the same vibration isolation, however, and will not undergo the same cyclical displacement.

Figure 10:
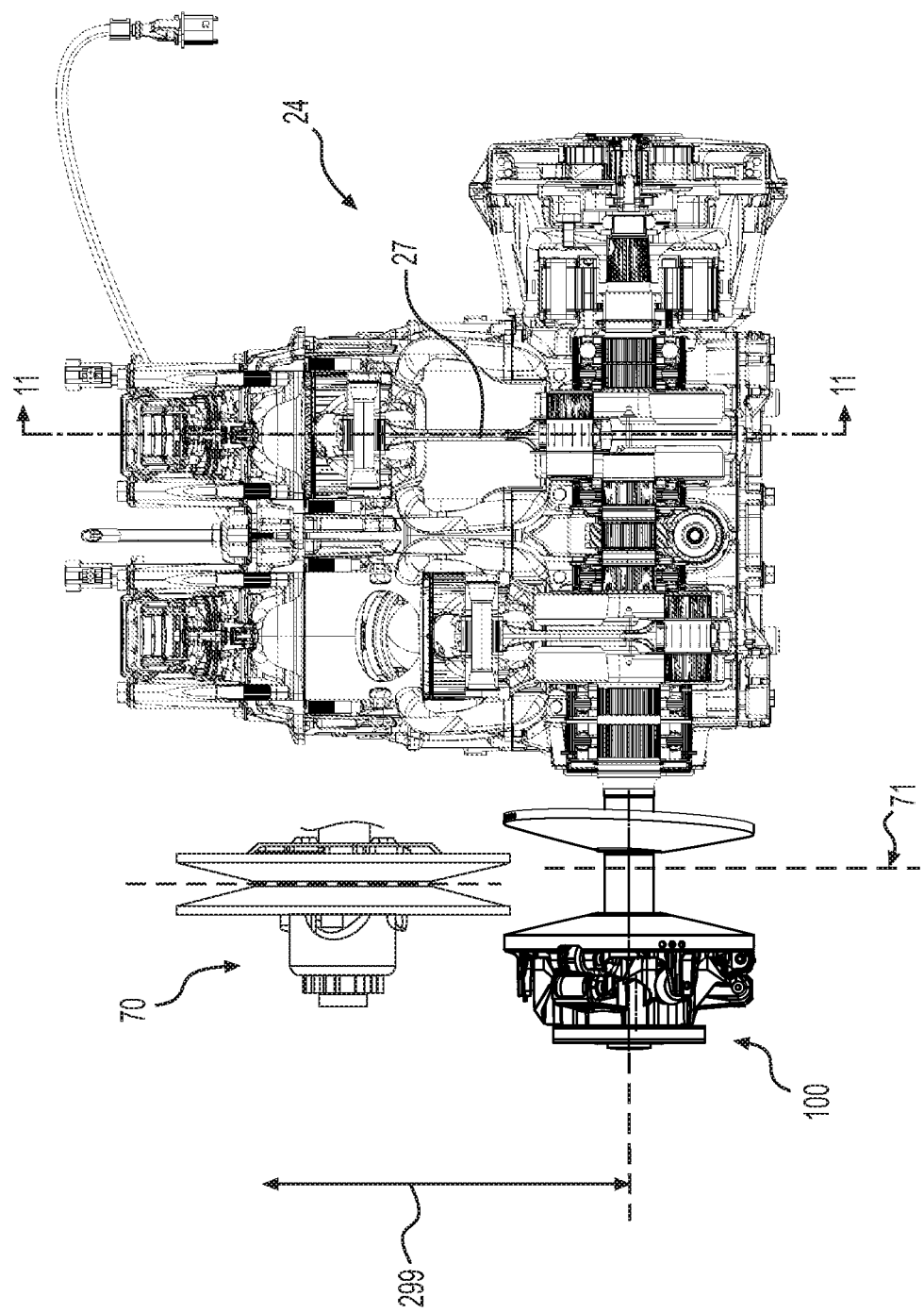
FIG. 10 is a cross-sectional view of the engine of FIG. 2 taken through line 10-10 of FIG. 2 with the drive pulley and the driven pulley overlaid on the cross-section.

At one illustrative point in the engine cycle, shown in FIG. 8, the first piston 25 is in a bottom dead center position and the second piston 27 is in a top dead center position (FIG. 10). At this second point in the cycle, the engine 24, the driving shaft 90 and the drive pulley 100 are displaced away the driven pulley 70 and the driven shaft 72. The driving shaft 90 and the driven shaft 72 are separated by the largest separation in the cyclical displacement, being separated by a maximum displacement 299.

At another illustrative point in the engine cycle, represented in FIG. 9, a first piston 25 is in a top dead center position and a second piston 27 is in a bottom dead center position (pistons 25, 27 illustrated in FIG. 10). With this orientation of the driving shaft 90, the engine 24, the driving shaft 90 and the drive pulley 100 are displaced toward the driven pulley 70 and the driven shaft 72. At this point in the cycle, the driving shaft 90 and the driven shaft 72 are at their closest in the cyclical displacement, being separated by a minimum displacement 298 (measured from the center 79 of the drive pulley 100 to the center 77 of the driven pulley 70).

By properly orienting the drive pulley 100 with respect to the driving shaft 90, the effect of the cyclical displacement of the drive pulley 100 relative to the driven pulley 70 on the drive belt 76 can be compensated. For a given rotation speed of the drive pulley 100, at the point in the cycle where the drive shaft 90 is nearest the driven shaft 72, illustrated schematically in FIG. 9, the drive belt 76 should be at its farthest distance from the axis of rotation 190. At the point in the cycle where the drive pulley 100 is farthest from the driven pulley 70, illustrated schematically in FIG. 8, the drive belt 76 should be at its nearest to the axis of rotation 190. As such, the effect on the drive belt 76 of the movement of the drive pulley 100 away from the driven pulley 70 is compensated and the drive belt 76 experiences little change in tension due to the cyclical displacement of the drive pulley 100.

As such, the drive pulley 100 is aligned relative to the drive shaft 90 such that the drive belt 76 contacts the sheave faces 103, 105 at the position where the minimum separation 185 is measured when the drive pulley 100 is nearest to the driven pulley 70. As described above, this occurs when the piston 27 is in the bottom dead center position. When the piston 27 is in the top dead center position, the drive pulley 100 is farthest from the driven pulley 70. The maximum separation 186 was measured at a position 180 degrees around the axis of rotation 190 from the separation 185, so the larger distance having to be spanned by the drive belt 76 is compensated in this alignment as the drive belt 76 contacts the sheave faces 103, 105 at the position where the separation 186 is measured. Properly aligned, the drive belt 76 contacts the sheave faces 103, 105 of the drive pulley 100 at the angular position of the maximum separation 186 when the engine 24 experiences its maximum displacement 299 of the cyclical displacement.

The maximum separation 186 being larger than the minimum separation 185, the drive belt 76 contacts the sheave faces 103, 105 at a smaller radial distance from the axis of rotation 190 at the position where the maximum separation 186 is measured, as described above. The end of the drive belt 76 looped around the drive pulley 100 thus shifts toward the axis of rotation 190, while the drive pulley 100 is displaced in the opposite direction. It is contemplated that the sheave faces 103, 105 could be designed to exactly compensate the cyclical displacement of the drive pulley 100, such that the portion of the drive belt 76 contacting the sheave faces 103, 105 experiences no displacement relative to the driven pulley 70. Thus the drive belt 76 remains under a generally constant tension and does not apply a cyclical force upon the driven pulley 70. As such, the maximum separation 186 is oriented to minimize pulling forces on the drive belt 76 due to the unbalanced moments and forces of rotation components of the engine 24. It is also contemplated that angularly orienting the drive pulley 100 within 30 degrees of the maximum separation 186 aligning with the maximum displacement 299 could provide some compensation of the cyclical displacement.

As described above, the key 175 disposed in the keyway 176 aids in aligning the drive pulley 100 to the drive shaft 90. In this way the drive pulley 100 can be properly oriented during installation relative to the cyclical displacement of the engine 24, drive shaft 90 and drive pulley 100.

Figure 11:
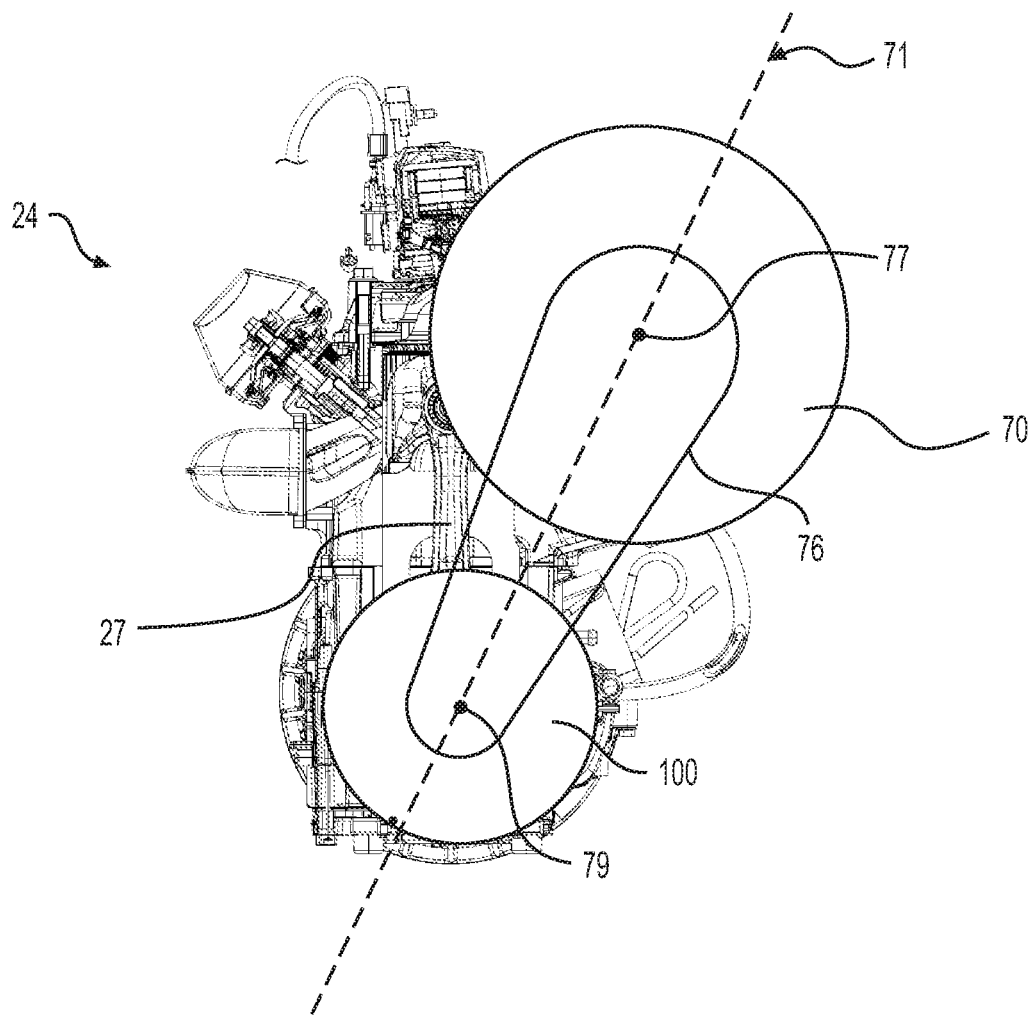
FIG. 11 is a cross-sectional view of the engine of FIG. 2 taken through line 11-11 of FIG. 10 with a schematic representation of the CVT overlaid on the cross-section.

While the driven pulley 70 and the cyclical displacement of the drive pulley 100, drive shaft 90 and the engine 24 are schematically drawn in the same plane in FIGS. 8 and 9, the physical layout is more complicated, as seen in FIGS. 10 and 11. The engine 24 is shown in more detail in FIG. 10, where the piston 27 is in the top dead center position and thus the drive pulley 100 is at the maximum separation 299 from the driven pulley 70. The line 71 through the centers 77, 79 of the pulleys 70, 100, as seen in FIG. 11, is not in the same plane as the pistons 25, 27, but in fact is at an angle to the pistons 25, 27.

In the present implementation, the maximum displacement 299 occurs when the piston 27 is in the top dead center position. It is contemplated that in other implementations this may be different, depending on various factors including, only as an example, different unbalanced moments or forces within different engine implementations. It is contemplated, for example, that the maximum displacement 299 could occur for other positions of the piston 27. It is also contemplated that the engine 24 could have three or more pistons which may have various positions for the maximum displacement 299. It is further contemplated that the engine 24 could have a single piston 27, which may have another position for the maximum displacement 299.

It is further contemplated that the engine 24, driving shaft 90 and drive pulley 100 could cyclically displace at a higher frequency than the rotation of the drive pulley 100. For example, the engine 24, driving shaft 90 and drive pulley 100 could experience two cycles of displacement for every rotation of the drive pulley 100. In such a case, there could be, for example, two maximum separations and two minimum separations between the two sheaves 103, 105.

Figure 12:
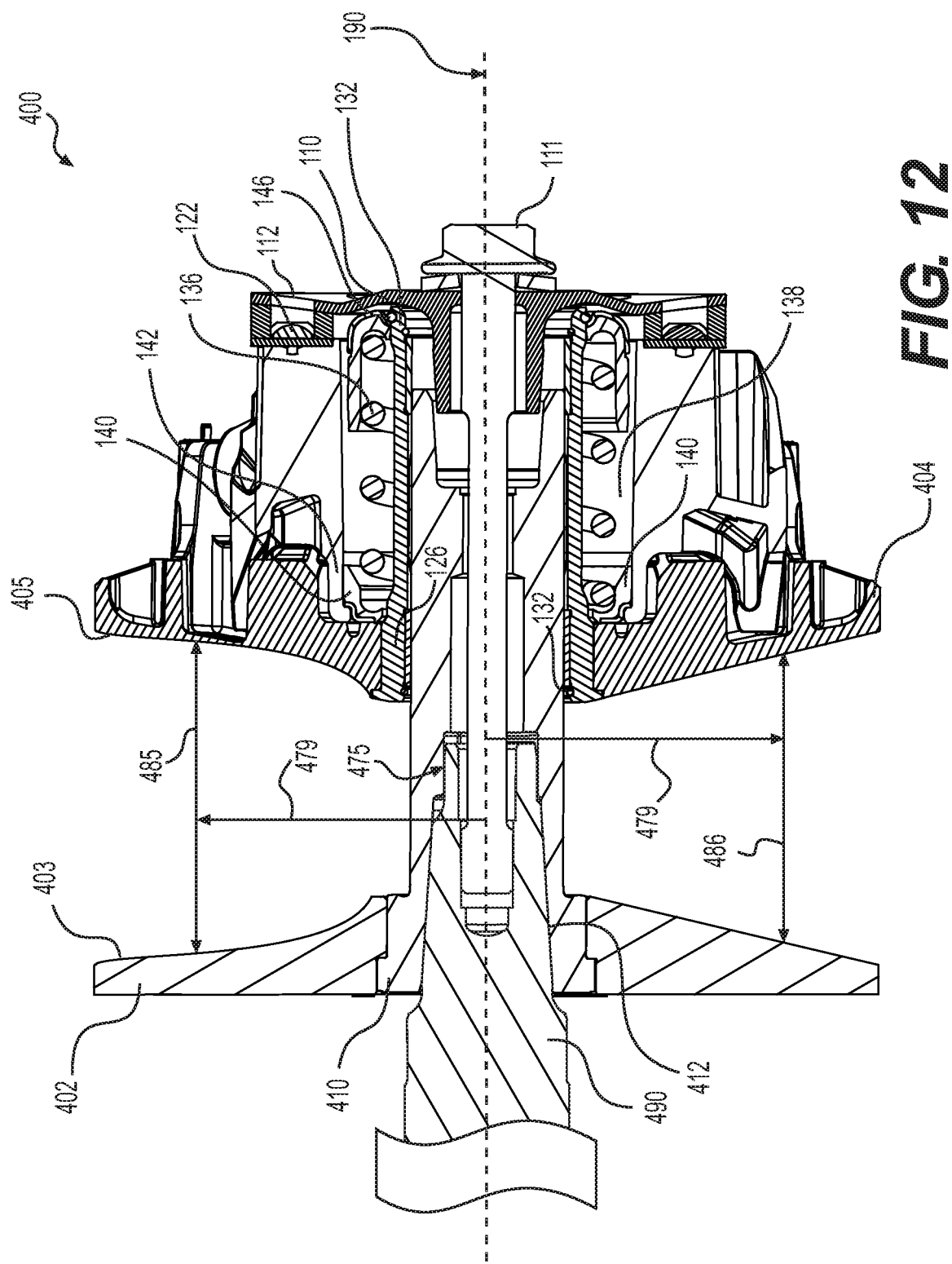
FIG. 12 is a front elevation cross-sectional view of another different implementation of a drive pulley of the CVT.

Another implementation of the drive pulley 400 in accordance with the present technology is illustrated in FIGS. 12 and 13. Elements of the drive pulley 400 that are similar to those of the drive pulley 100 retain the same reference numeral.

The drive pulley 400 includes a fixed sheave 402 having a sheave face 403, the fixed sheave 402 being mounted on a fixed sheave shaft 410. The drive pulley 400 also includes a movable sheave 404 having a sheave face 405. Both sheaves 402 and 404 rotate together with a driving shaft 490. As can be seen in FIGS. 12 and 13, the fixed sheave shaft 410 is hollow and has a tapered hollow portion 412. The tapered hollow portion 412 receives the end of the driving shaft 490 therein to transmit torque from the engine 24 to the drive pulley 400.

Similarly to the drive pulley 100 described above, at a given radius 479, a distance measured between the two sheave faces 403, 405 varies around the axis of rotation 190. As seen in FIG. 12, two representative separations, 485 and 486, are measured for illustrative purposes at two points opposite one another, at the same given radius 479. As can be seen from FIG. 12, the first separation 485 at the given radius 479 is larger than the second separation 486 at the same radius 479.

In the drive pulley 400, both the sheave face 403 of the fixed sheave 402 and the sheave face 405 of the movable sheave 404 have surface shapes that vary at different angles about the axis of rotation 190 as well as different radii from the axis of rotation 190. As illustrated in FIG. 12, the cross-section of the sheave face 403 is generally linear at the radial angle where the separation 486 is measured, while the cross-section of the sheave face 403 is curved at the radial angle where the separation 485 is measured. It should be noted that the sheave face 403 varies smoothly between the radial positions where the separations 485, 486 are measured. The sheave face 405 is a mirror image of the sheave face 403, although it is contemplated that the sheave faces 403, 405 may not be mirror-images of each other in some implementations.

As described above in relation to FIG. 2 and the drive pulley 100, during operation the drive belt 76 is looped around the drive pulley 400. At a given rotation speed of the drive pulley 400, the drive belt 76 contacts the sheave faces 403, 405 at a distance relative to the axis of rotation 190 that depends on the separation of the sheave faces 403, 405. The drive belt 76, having a fixed width, contacts the sheave faces 403, 405 at the radial distance from the axis of rotation 190 where the two edges of the drive belt 76 contact the sheave faces 403, 405. Thus, the drive belt 76 contacts the sheave faces 403, 405 where their axial separation matches the drive belt width. As before, when the drive pulley 400 is in an open position and the movable sheave 404 is far from the fixed sheave 402, the drive belt 76 will contact the sheave faces 403, 405 near the axis of rotation 190 and when the drive pulley 400 is in a more closed position and the movable sheave 404 is near the fixed sheave 402, the drive belt 76 will contact the sheave faces 403, 405 farther from the axis of rotation 190.

Due to the variation of the axial distance between the sheave faces 403, 405 for a given axial position of the movable sheave 404 relative to the fixed sheave 402, the radial distance from the axis of rotation 190 at which the drive belt 76 contacts the sheave faces 403, 405 varies as the drive pulley 400 rotates at a constant rotation speed. When the drive pulley 400 is oriented such that the portion of the drive belt 76 contacting the sheave faces 403, 405 is near the position of the larger separation 485, the drive belt 76 is nearer to the axis of rotation 190. As the drive pulley 400 turns, the drive belt 76 will get radially farther away from the axis of rotation 190, until the drive pulley 100 has turned 180 degrees and the drive belt 76 is contacting the sheave faces 403, 405 near the smaller separation 486. During operation, this cyclical movement of the drive belt 76 relative to the axis of rotation 190 continues so long as the drive pulley 400 rotates, as described above with respect to the drive pulley 100.

For the drive pulley 400, an amplitude of travel of the drive belt 76 toward and away from the axis of rotation 190 as the drive pulley 400 turns will depend on a position of the drive pulley 400. For example, when the drive pulley 400 is in an open position and the drive belt 76 contacts the sheave faces 403, 405 near the axis of rotation 190 where the sheave faces 403, 405 are more curved, the drive belt 76 will travel over a relatively large radial distance during one rotation of the drive pulley 400. When the drive pulley 400 is in a closed position, however, and the drive belt 76 contacts the sheave faces 403, 405 farther from the axis of rotation 190, the sheave faces 403, 405 are more linear and the belt 76 will travel over a smaller radial distance during one rotation of the drive pulley 400. As such, in the open position the drive pulley 400 compensates for a larger cyclical displacement of the engine 24 than when in the closed position.

Due to the rotationally asymmetric form of the drive pulley 400, an angular orientation of the drive pulley 400 with respect to an angular position of the driving shaft 490 is provided during installation or replacement of the drive pulley 400 by an alignment feature.

In the drive pulley 400, the alignment feature is an asymmetric end portion 470 of the driving shaft 490. The end portion 470 is generally circular, with one flat surface 475 machined into the end portion 470, as can be seen in FIG. 13. The hollow portion 412 of the fixed sheave shaft 410 is shaped to receive the end portion 470, being generally circular with a flattened portion, as can also be seen in FIG. 13. In order for the drive pulley 400 and the driving shaft 490 to be assembled together, the drive pulley 400 must be mounted on the driving shaft 490 at a predetermined angular orientation. It is contemplated that the drive pulley 400 could be provided with the alignment feature including the key 175 described above. It is similarly contemplated that the drive pulley 100 could be provided with the flattened end portion 470 in some implementations. It is further contemplated that any of the drive pulleys described herein could be provided with different alignment features, or may not include an alignment feature.

Another implementation of a drive pulley 500 in accordance with the present technology is illustrated in FIG. 14. Elements of the drive pulley 500 that are similar to those of the drive pulley 400 retain the same reference numeral.

The drive pulley 500 includes a fixed sheave 502 having a sheave face 503 and a movable sheave 504 having a sheave face 505. As seen in FIG. 14, two representative separations, 585 and 586, are measured for illustrative purposes at two points opposite one another, at a same given radius 579. The first separation 585 at the given radius 579 is larger than the second separation 586 at the same radius 579.

Similarly to drive pulley 400 described above, both the sheave face 503 of the fixed sheave 502 and the sheave face 505 of the movable sheave 504 have surface shapes that vary at different points about the axis of rotation 190 and at different radial distances from the axis of rotation 190. As illustrated in FIG. 14, the cross-sections of the sheave faces 503, 505 are generally linear at the radial angle where a separation 586 is measured and have generally three different linear zones at an angle where the separation 585 is measured. It should be noted that the sheave faces 503, 505 vary smoothly between the radial positions where the separations 585, 586 are measured. The sheave face 505 is a mirror image of the sheave face 503, although it is contemplated that the sheave faces 503, 505 may not be mirror-images of each other in some implementations.

Similarly to the drive pulley 400, an amplitude of travel of the drive belt 76 toward and away from the axis of rotation 190 as the drive pulley 500 turns will depend on a position of the drive pulley 500. For example, when the drive pulley 500 is in a fully open position and the drive belt 76 contacts the sheave faces 503, 505 near the axis of rotation 190, the drive belt 76 will travel over a first radial distance during one rotation of the drive pulley 500. When the drive pulley 500 is in a fully closed position and the drive belt 76 contacts the sheave faces 503, 505 far from the axis of rotation 190, the drive belt 76 will travel over a second radial distance different from the first. When the drive pulley 500 is in a partially closed position and the drive belt 76 contacts the sheave faces 503, 505 at an intermediate radius compared to the open and closed positions, the drive belt 76 will travel over a third, different radial distance. As such, sheaves faces 503, 505 of the drive pulley 500 provide compensation for at least three different amplitudes of cyclical displacement of the engine 24. It is contemplated that the sheave faces 503, 505 could have surface shapes with more or fewer different zones of different separation variation. The difference zones of the sheave faces 503, 505 also need not be linear, as will be described below.

Another implementation of a drive pulley 600 in accordance with the present technology is illustrated in FIG. 15. Elements of the drive pulley 600 that are similar to those of the drive pulley 400 retain the same reference numeral.

The drive pulley 600 includes a fixed sheave 602 having a sheave face 603 and a movable sheave 604 having a sheave face 605. Similarly to drive pulley 400 described above, at a given radius 677, a distance measured between the two sheave faces 603, 605 generally varies around the axis of rotation 190. As seen in FIG. 15, two representative separations, 683 and 684, are measured for illustrative purposes at two points opposite one another, at the given radius 677. The second separation 684 at the given radius 677 is larger than the first separation 683 at the same radius 677.

Similarly to drive pulley 400 described above, both the sheave face 603 of the fixed sheave 602 and the sheave face 605 of the movable sheave 604 have surface shapes that vary at different points about the axis of rotation 190. As illustrated in FIG. 15, the cross-sections of the sheave faces 603, 605 are generally linear at the radial angle where a separation 684 is measured, while the sheave faces 603, 605 have several different zones at the radial angle where the separation 683 is measured. It should be noted that the sheave faces 603, 605 vary smoothly between the radial positions where the separations 683, 684 are measured. The sheave face 605 is a mirror image of the sheave face 603, although it is contemplated that the sheave faces 603, 605 may not be mirror-images of each other in some implementations.

Similarly to the drive pulley 400, an amplitude of travel of the drive belt 67 toward and away from the axis of rotation 190 as the drive pulley 600 turns will depend on a position of the drive pulley 600. In this implementation, the drive pulley 600 compensates for many different amplitudes of cyclical displacement of the engine 24, as described above. Additionally, when the drive pulley 600 is in a closed position and the drive belt 76 contacts the sheave faces 603, 605 at a radial distance 679 where separation 685 is measured, the drive pulley 600 provides no compensation for cyclical displacement, as the separations 685 and 686, measured at an angle opposite 685, are equal. Further, in the implementation of the drive pulley 600, the orientation of a maximum separation between the sheave faces 603, 605 also depends on the position of the drive pulley 600. For example, at the radial distance 677, the sheave faces 603, 605 have a minimum separation at the angle where the separation 683 is measured, whereas at a radial distance 675, the sheave faces 603, 605 have a maximum separation 681 at that same angle. As such, the drive pulley 600 compensates for different directions of cyclical displacements at difference rotational speeds of the drive pulley 600. It is contemplated that maximum and minimum separations can be found at various angular locations, depending on the unbalanced moments and forces of rotating components specific to an implementation of the engine 24, the maximum separation being orientated with respect to the output shaft to minimize pulling forces of the drive belt 76 on the driven pulley 70.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A drive pulley for a continuously variable transmission comprising:
    a fixed sheave having a first sheave face;
    a movable sheave axially movable relative to the fixed sheave along an axis of rotation of the continuously variable transmission, the movable sheave having a second sheave face, the fixed sheave and the movable sheave rotating about the axis of rotation; and
    a separation measured at a constant radial distance from the axis of rotation along an axial direction between the first sheave face and the second sheave face, the separation varying around the axis of rotation,
    a first separation, measured at a given radial distance from the axis of rotation and at a first angular position about the axis of rotation, between the first sheave face and the second sheave face being greater than a second separation, measured at the given radial distance from the axis of rotation and at a second angular position about the axis of rotation, between the first sheave face and the second sheave face, the second angular position being different from the first angular position,
    a position of a maximum separation between the first sheave face and the second sheave face, at the given radial distance from the axis of rotation, rotating about the axis of rotation as the drive pulley rotates about the axis of rotation.

2. The drive pulley of claim 1, wherein:
    the first sheave face is symmetric about an axis of symmetry; and
    the axis of symmetry is skewed relative to the axis of rotation.

3. The drive pulley of claim 1, wherein:
    the first sheave face is asymmetric around the axis of rotation; and
    the second sheave face is symmetric around the axis of rotation.

4. The drive pulley of claim 1, wherein:
    the first sheave face is symmetric around the axis of rotation; and
    the second sheave face is asymmetric around the axis of rotation.

5. The drive pulley of claim 1, wherein:
    the first sheave face is asymmetric around the axis of rotation; and
    the second sheave face is asymmetric around the axis of rotation.

6. The drive pulley of claim 1, wherein separations measured at different radial distances from the axis of rotation along the axial direction between the first sheave face and the second sheave face vary non-linearly as the separations are measured at increasing radial distances from the axis of rotation.

7. The drive pulley of claim 1, further comprising:
    a spider axially fixed relative to the fixed sheave and rotationally fixed relative to the movable sheave, the movable sheave being disposed axially between the spider and the fixed sheave; and
    a biasing member biasing the movable sheave axially away from the fixed sheave.

8. A vehicle comprising:
    a frame;
    an engine connected to the frame, the engine having a plurality of pistons, the engine experiencing a cyclical displacement during operation;
    a driving shaft operatively connected to and driven by the engine;
    a continuously variable transmission having:
        a drive pulley being operatively connected to and driven by the driving shaft, the drive pulley having:
            a fixed sheave having a first sheave face, the fixed sheave being rotationally and axially fixed relative to the driving shaft,
            a movable sheave axially movable relative to the fixed sheave along an axis of rotation of the continuously variable transmission, the movable sheave having a second sheave face, and
            a separation between the first sheave face and the second sheave face, the separation being measured along an axial direction, at a constant radial distance from the axis of rotation, the axial direction being parallel to the axis of rotation, the separation varying around the axis of rotation,
        a driven pulley,
        a drive belt looped around the drive pulley and the driven pulley, and
        a driven shaft connected to and driven by the driven pulley; and
    at least one ground engaging member operatively connected to and driven by the driven shaft,
    the drive pulley being oriented angularly on the driving shaft such that a portion of the drive belt is in contact with the drive pulley at a maximum separation between the first sheave face and the second sheave face when the engine experiences a maximum displacement of the cyclical displacement in a direction opposite the driven pulley.

9. The vehicle of claim 8, wherein:
    the maximum separation between the first sheave face and the second sheave face is oriented angularly within 30 degrees of a line passing through a center of the drive pulley and a center of the driven pulley when the engine experiences the maximum displacement of the cyclical displacement in the direction opposite the driven pulley.

10. The vehicle of claim 8, wherein:
the maximum separation between the first sheave face and the second sheave face is generally aligned with a line passing through a center of the drive pulley and a center of the driven pulley when the engine experiences the maximum displacement of the cyclical displacement in the direction opposite the driven pulley.

11. The vehicle of claim 10, wherein:
the engine experiences the maximum displacement of the cyclical displacement in the direction opposite the driven pulley when a piston of the plurality of pistons that is farthest from the drive pulley is in a top dead center position.

12. The vehicle of claim 8, wherein:
the first sheave face is asymmetric around the axis of rotation; and
the second sheave face is symmetric around the axis of rotation.

13. The vehicle of claim 8, wherein:
the first sheave face is symmetric around the axis of rotation; and
the second sheave face is asymmetric around the axis of rotation.

14. The vehicle of claim 8, wherein:
the first sheave face is symmetric about an axis of symmetry; and
the axis of symmetry is skewed relative to the axis of rotation.

15. The vehicle of claim 8, wherein:
the first sheave face is asymmetric around the axis of rotation; and
the second sheave face is asymmetric around the axis of rotation.

16. The vehicle of claim 8, wherein the separations measured at different radial distances from the axis of rotation along the axial direction between the first sheave face and the second sheave face vary non-linearly as the separations are measured at increasing radial distances from the axis of rotation.

17. The vehicle of claim 8, wherein:
an angle between the axis of rotation and at least one of the first sheave face and the second sheave face varies around the axis of rotation.

18. The vehicle of claim 8, wherein the driving shaft is a crankshaft.

19. The vehicle of claim 8, further comprising an alignment feature providing angular alignment of the drive pulley with respect to an angular position of the driving shaft.

20. The vehicle of claim 19, wherein:
the alignment feature is a key, the key being disposed between the fixed sheave and the driving shaft in a keyway defined at least in part in an interior of the fixed sheave.

21. The vehicle of claim 19, wherein:
the alignment feature is an asymmetric end portion of the driving shaft, the asymmetric end portion being received at least in part in an interior of the fixed sheave.

22. A vehicle comprising:
a frame;
an engine connected to the frame, the engine having at least one piston connected to an output shaft, the engine experiencing a cyclical displacement with respect to the frame during operation;
a continuously variable transmission having:
a drive pulley being operatively connected to and driven by the output shaft, the drive pulley having:
a fixed sheave having a first sheave face, the fixed sheave being rotationally and axially fixed relative to the output shaft,
a movable sheave axially movable relative to the fixed sheave along an axis of rotation of the continuously variable transmission, the movable sheave having a second sheave face, the fixed sheave and the movable sheave rotating about the axis of rotation,
a separation between the first sheave face and the second sheave face, the separation being measured along an axial direction at a constant radial distance from the axis of rotation, the axial direction being parallel to the axis of rotation, the separation varying around the axis of rotation,
a driven pulley, and
a drive belt looped around the drive pulley and the driven pulley, the drive pulley being oriented angularly on the output shaft such that a portion of the drive belt is in contact with the drive pulley at a maximum separation between the first sheave face and the second sheave face, the portion of the drive belt being in contact with the drive pulley at the maximum separation when:
the maximum separation is generally aligned with a line passing through a center of the drive pulley and a center of the driven pulley, and
the least one piston is in a top dead center position.

23. The vehicle of claim 22, wherein the at least one piston is at least two pistons, one of the at least two pistons being in a top dead center position.

24. The vehicle of claim 23, wherein the one of the at least two pistons that is in a top dead center position is a piston of the at least two pistons that is farthest away from the drive pulley.

25. The vehicle of claim 22, wherein:
the first sheave face is asymmetric around the axis of rotation; and
the second sheave face is symmetric around the axis of rotation.

26. The vehicle of claim 22, wherein:
the first sheave face is symmetric around the axis of rotation; and
the second sheave face is asymmetric around the axis of rotation.

27. The vehicle of claim 22, wherein:
the first sheave face is symmetric about an axis of symmetry; and
the axis of symmetry is skewed relative to the axis of rotation.

28. The vehicle of claim 22, wherein:
the first sheave face is asymmetric around the axis of rotation; and
the second sheave face is asymmetric around the axis of rotation.

29. The vehicle of claim 22, wherein separations measured at different radial distances from the axis of rotation along the axial direction between the first sheave face and the second sheave face vary non-linearly as the separations are measured at increasing radial distances from the axis of rotation.

30. A vehicle comprising:
a frame;

an engine connected to the frame, the engine having at least one piston connected to an output shaft, the engine experiencing a cyclical displacement with respect to the frame during operation;

a continuously variable transmission having:
- a drive pulley being operatively connected to and driven by the output shaft, the drive pulley having:
  - a fixed sheave having a first sheave face, the fixed sheave being rotationally and axially fixed relative to the output shaft,
  - a movable sheave axially movable relative to the fixed sheave along an axis of rotation of the continuously variable transmission, the movable sheave having a second sheave face, the fixed sheave and the movable sheave rotating about the axis of rotation, and
  - a separation between the first sheave face and the second sheave face, the separation being measured along an axial direction at a constant radial distance from the axis of rotation, the axial direction being parallel to the axis of rotation the separation varying around the axis of rotation, at the constant radial distance
  - a maximum separation, measured at a given radial distance from the axis of rotation and at a first angular position about the axis of rotation, between the first sheave face and the second sheave face being greater than a minimum separation, measured at the given radial distance from the axis of rotation and at a second angular position about the axis of rotation, between the first sheave face and the second sheave face, the second angular position being different from the first angular position,
- a driven pulley, and
- a drive belt looped around the drive pulley and the driven pulley,
- a position of the maximum separation between the first sheave face and the second sheave face rotating about the axis of rotation as the drive pulley rotates about the axis of rotation, the maximum separation being orientated with respect to the output shaft to minimize pulling forces of the drive belt on the driven pulley due to unbalanced moments and forces of rotating components of the engine.

31. The vehicle of claim 30, wherein:
the maximum separation is generally aligned with a line passing through a center of the drive pulley and a center of the driven pulley when the engine experiences a maximum displacement of the cyclical displacement in a direction opposite the driven pulley.

32. The vehicle of claim 31, wherein:
the at least one piston includes a plurality of pistons; and the engine experiences the maximum displacement of the cyclical displacement in the direction opposite the driven pulley when a piston of the plurality of pistons that is farthest from the drive pulley is in a top dead center position.

33. The vehicle of claim 30, wherein:
the axis of rotation is a first axis of rotation;
the fixed sheave further includes a fixed sheave shaft having a second axis of rotation; and
the first sheave face is asymmetric around the second axis of rotation.

34. A drive pulley for a continuously variable transmission comprising:
a fixed sheave having a first sheave face;
a movable sheave axially movable relative to the fixed sheave along an axis of rotation of the continuously variable transmission, the movable sheave having a second sheave face, the fixed sheave and the movable sheave rotating about the axis of rotation; and
a separation measured at a constant radial distance from the axis of rotation along an axial direction between the first sheave face and the second sheave face, the separation varying around the axis of rotation,
a first angle formed between the axis of rotation and at least one of the first sheave face and the second sheave face at a first angular position about the axis of rotation being greater than a second angle formed between the axis of rotation and the at least one of the first sheave face and the second sheave face at a second angular position about the axis of rotation, the first angle being different from the second angle,
a position of a maximum separation between the first sheave face and the second sheave face rotating about the axis of rotation as the drive pulley rotates about the axis of rotation.

35. A drive pulley for a continuously variable transmission comprising:
a fixed sheave having a first sheave face;
a movable sheave axially movable relative to the fixed sheave along an axis of rotation of the continuously variable transmission, the movable sheave having a second sheave face, the fixed sheave and the movable sheave rotating about the axis of rotation; and
a plurality of separations measured at a same radial distance from the axis of rotation along an axial direction and at a plurality of angular positions about the axis of rotation between the first sheave face and the second sheave face, the plurality of separations having different values at the plurality of angular positions,
a position of a maximum separation between the first sheave face and the second sheave face rotating about the axis of rotation as the drive pulley rotates about the axis of rotation.

* * * * *

UNITED STATES PATENT AND TRADEMARK OFFICE
CERTIFICATE OF CORRECTION

| | |
|---|---|
| PATENT NO. | : 11,421,771 B2 |
| APPLICATION NO. | : 15/771819 |
| DATED | : August 23, 2022 |
| INVENTOR(S) | : Xavier-Pierre Aitcin et al. |

It is certified that error appears in the above-identified patent and that said Letters Patent is hereby corrected as shown below:

In the Claims

Column 23, Claim 30, Line 21 should read: --to the axis of rotation, the separation--

Column 23, Claim 30, Lines 23 and 24 should read: --at the constant radial distance,--

Signed and Sealed this
Eleventh Day of July, 2023

Katherine Kelly Vidal
*Director of the United States Patent and Trademark Office*